(12) United States Patent
Koide et al.

(10) Patent No.: US 7,462,971 B2
(45) Date of Patent: Dec. 9, 2008

(54) ARMATURE WINDING, METHOD FOR MANUFACTURING ARMATURE WINDING, AND SLOTLESS MOTOR

(75) Inventors: Keisuke Koide, Shizuoka-ken (JP); Takahiro Nakayama, Shizuoka-ken (JP); Yoshiyuki Takabe, Shizuoka-ken (JP); Shinichi Naitou, Shizuoka-ken (JP); Yoshihito Nishikawa, Shizuoka-ken (JP); Makoto Morisaki, Shizuoka-ken (JP)

(73) Assignee: ASMO Co., Ltd. (JP)

( * ) Notice: Subject to any disclaimer, the term of this patent is extended or adjusted under 35 U.S.C. 154(b) by 507 days.

(21) Appl. No.: 11/371,337

(22) Filed: Mar. 7, 2006

(65) Prior Publication Data

US 2006/0238058 A1 Oct. 26, 2006

(30) Foreign Application Priority Data

Mar. 7, 2005 (JP) ............................. 2005-062727

(51) Int. Cl.
*H02K 21/12* (2006.01)
(52) U.S. Cl. .................... 310/201; 310/254; 310/179; 310/208; 310/156.43
(58) Field of Classification Search ............... 310/201, 310/254, 179, 208, 156.43, 203, 180, 156.53, 310/156.22
See application file for complete search history.

(56) References Cited

U.S. PATENT DOCUMENTS

| 3,999,093 | A | * | 12/1976 | Kirtley, Jr. ............... 310/198 |
| 4,519,088 | A | * | 5/1985 | Rademacher et al. ...... 377/16 |
| 6,140,734 | A | * | 10/2000 | Hazelton et al. ........... 310/198 |
| 6,741,004 | B2 | * | 5/2004 | Senoo et al. .............. 310/215 |
| 2006/0238058 | A1 | * | 10/2006 | Koide et al. ............ 310/156.55 |
| 2007/0090717 | A1 | * | 4/2007 | Kataoka et al. ............ 310/217 |

FOREIGN PATENT DOCUMENTS

| JP | 08-322221 | 12/1996 |
| JP | 2002-354721 | 12/2002 |

* cited by examiner

*Primary Examiner*—Gary F. Paumen
(74) *Attorney, Agent, or Firm*—Sheridan Ross P.C.

(57) ABSTRACT

A first armature winding and a second armature winding each include a tubular member, a first conductor arranged in a radially inner side of the tubular member, and a second conductor arranged in a radially outer side of the tubular member. The first conductor includes a first coated portion, which is coated by a coating formed from an insulator, and a first wire connection portion, which is free from the insulator. The second conductor includes a second coated portion, which is coated by a coating formed from an insulator, and a second wire connection portion, which is free from the insulator. The first wire connection portion and the second wire connection portion are electrically connected to each other. A large output is obtained from a slotless motor including the first armature winding and the second armature winding.

18 Claims, 20 Drawing Sheets

Fig.5
- S101 Punch thin conductive plate to form conductor strip
- S102 Apply coating to conductor strip
- S103 Fix conductor to plate member
- S104 Form tubular shape with plate member
- S105 Electrically connect conductors
- S106 Connect wire connection portion to copper wire terminal
- S107 Connect copper wire terminals
- S108 Fix to yoke
Fig.6
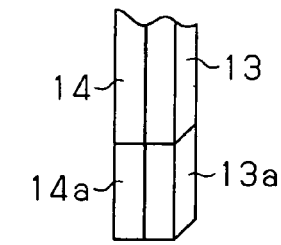
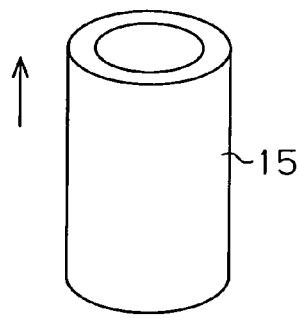

Fig.10A    Fig.10B    Fig.10C
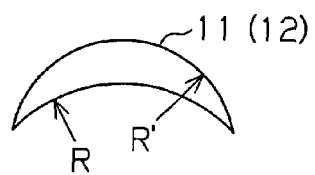 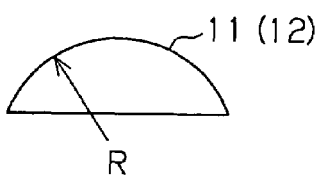 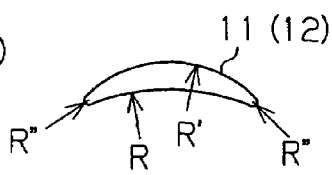
Fig.11A    Fig.11B    Fig.11C
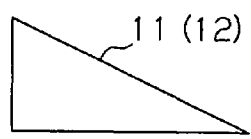 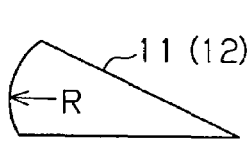 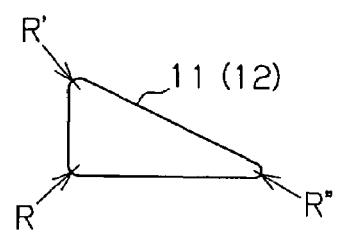
Fig.12A    Fig.12B
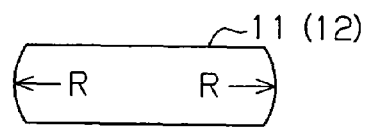 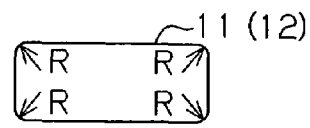
Fig.12C    Fig.12D
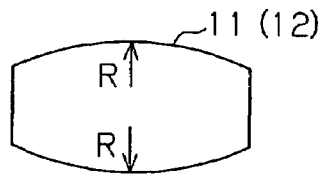 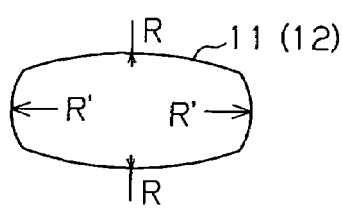

ARMATURE WINDING, METHOD FOR MANUFACTURING ARMATURE WINDING, AND SLOTLESS MOTOR

BACKGROUND OF THE INVENTION

The present invention relates to an armature winding, a method for manufacturing the armature winding, and a slotless motor.

A slotless motor is a motor that uses an armature that does not include a steel core thereby reducing cogging torque or torque ripple in comparison with a motor that uses an armature including a steel core. Since the mass of the armature that does not include a steel core is small, the drivability of the motor becomes satisfactory when the armature that does not include a steel core is used on the rotor side. The motor can be miniaturized if the armature that does not include a steel core is used on the stator side since the dimension for a steel core in the radial direction becomes unnecessary.

Such a slotless motor is disclosed in, for example, Japanese Laid-Open Patent Publication No. 8-322221. In the slotless motor of the publication, stripes made of copper foil extending helically are arranged on a cylinder made of plastic resin to form an armature winding. Such an armature winding may be formed by performing photo-etching and is thus easily manufactured.

However, since the stripes made of copper foil receive current in the above described armature winding, the amount of current that flows through the armature winding is limited. Thus, it becomes difficult to obtain a large motor output. Further, sufficient space for insulation must be provided between the adjacent stripes since each stripe is not covered by an insulator. Thus, the stripes cannot be densely arranged. This is also another reason why it is difficult to obtain a large motor output.

SUMMARY OF THE INVENTION

It is an object of the present invention to provide an armature winding and a method for manufacturing an armature winding that obtains a slotless motor with a large output. A further object of the present invention is to provide a slotless motor that uses such an armature winding.

To achieve the above object, the present invention provides an armature winding. The armature winding includes a tubular member, a first conductor, arranged in a radially inner side of the tubular member, for receiving current, and a second conductor, arranged in a radially outer side of the tubular member, for receiving current. The first conductor includes a first coated portion, coated by an insulator, and a first wire connection portion, located at an end of the first coated portion and being free from the insulator. The second conductor includes a second coated portion, coated by an insulator, and a second wire connection portion, located at an end of the second coated portion and being free from the insulator. The first wire connection portion and the second wire connection portion are electrically connected to each other.

The present invention also provides a method for manufacturing the armature winding. The method includes the steps of forming the first conductor and the second conductor, forming the tubular member, fixing the first conductor to an inner surface of the tubular member and fixing the second conductor to an outer surface of the tubular member, and electrically connecting the first wire connection portion of the first conductor and the second wire connection portion of the second conductor, which are fixed to the tubular member, to each other.

The present invention further provides a method for manufacturing the armature winding. The method includes the steps of forming the first conductor and the second conductor, fixing the first conductor and the second conductor to a plate member having a first surface and a second surface, the first conductor being fixed to the first surface, and the second conductor being fixed to the second surface, forming a tubular shape with the plate member to which the first conductor and the second conductor are fixed so that the first conductor is arranged at the radially inner side of the tubular member and the second conductor is arranged at the radially outer side of the tubular member, and electrically connecting the first wire connection portion of the first conductor and the second wire connection portion of the second conductor to each other.

Furthermore, the present invention provides a slotless motor including the armature winding.

BRIEF DESCRIPTION OF THE DRAWINGS

FIG. 5 is a flowchart showing the manufacturing procedures for the armature winding of FIG. 2A;

FIG. 6 is a schematic view showing one example of a method for electrically connecting copper wire terminals of the armature winding of FIG. 2A;

FIGS. 8 to 12D are cross-sectional views of the conductor according to ten modifications of the present invention;

DETAILED DESCRIPTION OF THE PREFERRED EMBODIMENTS

A first embodiment of the present invention will now be described with reference to the drawings.

Figure 1A:
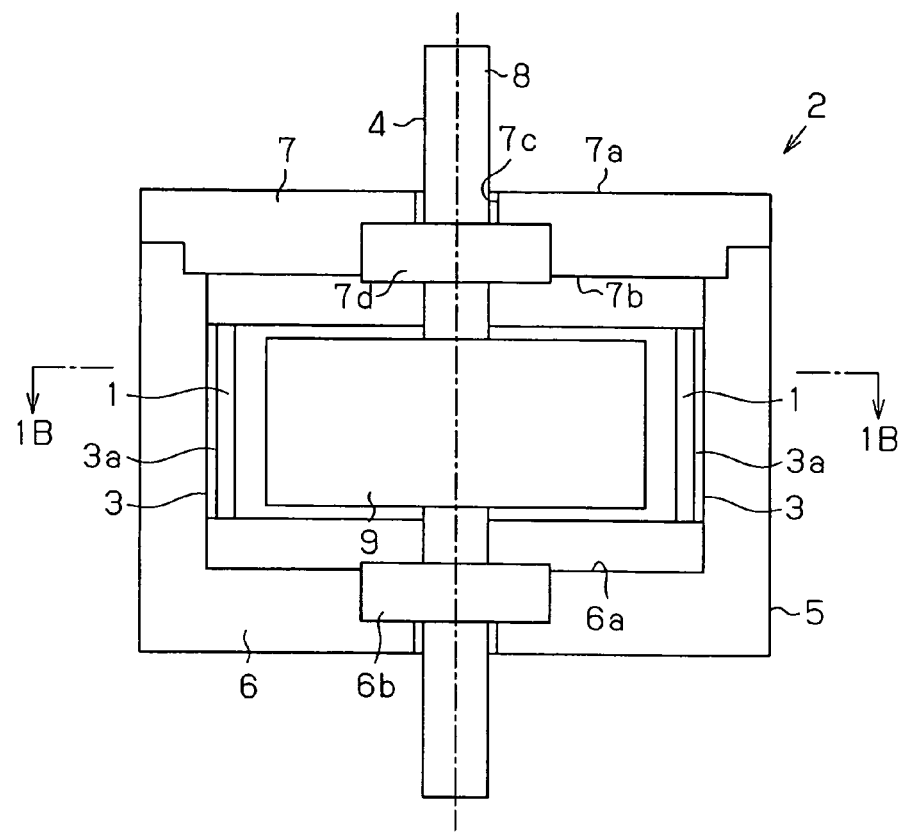
FIG. 1A is a schematic view of a slotless motor according to a first embodiment of the present invention.
Figure 1B:
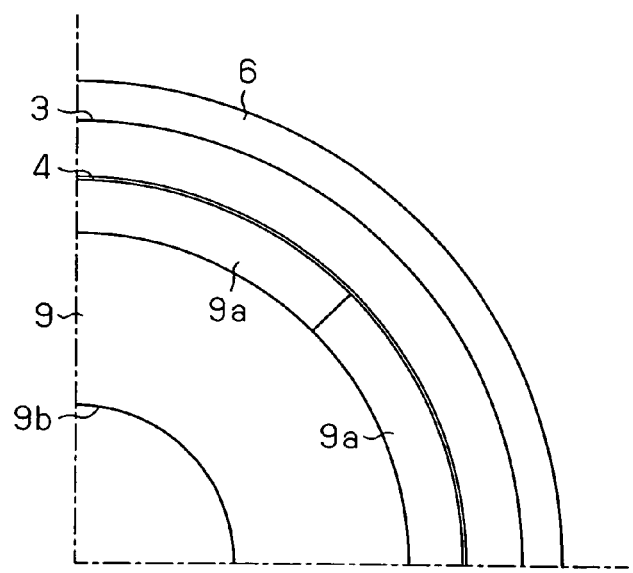
FIG. 1B is a cross-sectional view taken along line 1B-1B in FIG. 1A.

As shown in FIG. 1A and FIG. 1B, a slotless motor 2 includes a substantially cylindrical armature 3 having an armature winding 1, a rotor 4 that rotates with respect to the armature 3, and a case 5 that accommodates the armature 3 and the rotor 4.

The armature 3 will first be described. The armature 3 is formed by the armature winding 1 and a substantially cylindrical core 3a arranged coaxially with the armature winding 1. Slots are not formed in the core 3a.

The core 3a is made of a magnetic material and may be, for example, a superimposed core. The armature winding 1 is arranged in the radially inner side of the core 3a and fixed to the core 3a by an adhesive agent. The core 3a is fixed to the case 5, and the armature winding 1 is fixed to the case 5 by way of the core 3a. The armature winding 1 will hereinafter be described in detail.

The case 5 will now be described. The case 5 is formed by a substantially cylindrical yoke 6 with one end closed. An end plate 7 is fixed to the yoke 6 so as to close the open end of the yoke 6.

A first bearing 6b is fixed to the generally central portion of the bottom surface 6a of the yoke 6. The yoke 6 rotatably supports the rotor 4 with the first bearing 6b. The armature 3 is accommodated in the yoke 6 so as to be coaxial with the yoke 6 (see FIG. 1B).

A through hole 7c is formed in the end plate 7 so as to extend through the end plate 7 between the generally central portion of the two end surfaces 7a and 7b of the end plate 7. A second bearing 7d is arranged at the end surface 7b of the end plate 7 facing the bottom surface 6a of the yoke 6. The rotor 4 is rotatably supported with respect to the case 5 by the first bearing 6b, which is arranged in the yoke 6, and the second bearing 7d, which is arranged in the end plate 7.

The rotor 4 will now be described. The rotor 4 includes an output shaft 8, a rotor core 9, and a permanent magnet 9a.

The output shaft 8 extends through the through hole 7c of the end plate 7 and projects out of the case 5. The output shaft 8 is supported by the first bearing 6b of the yoke 6 and the second bearing 7d of the end plate 7 so as to rotatably support the rotor core 9 with respect to the armature winding 1.

The rotor core 9 has a substantially cylindrical shape. A center hole 9b extends through the rotor core 9 between the generally middle portions of the rotor core 9, and the output shaft 8 is inserted through the center hole 9b. Eight permanent magnets 9a (see FIG. 1B) are arranged on the radially outer side of the rotor core 9. The rotor core 9 may entirely be formed from steel or may be formed by superimposing a plurality of disk-shaped core sheets.

The permanent magnets 9a are arranged at an equiangular interval about the axis of the rotor core 9 and face the armature 3 (see FIG. 1B). The permanent magnets 9a that are adjacent in the circumferential direction of the rotor core 9 are arranged so that the N pole and the S pole are next to each other. Therefore, the number of poles in the rotor 4 is eight.

Figure 27:
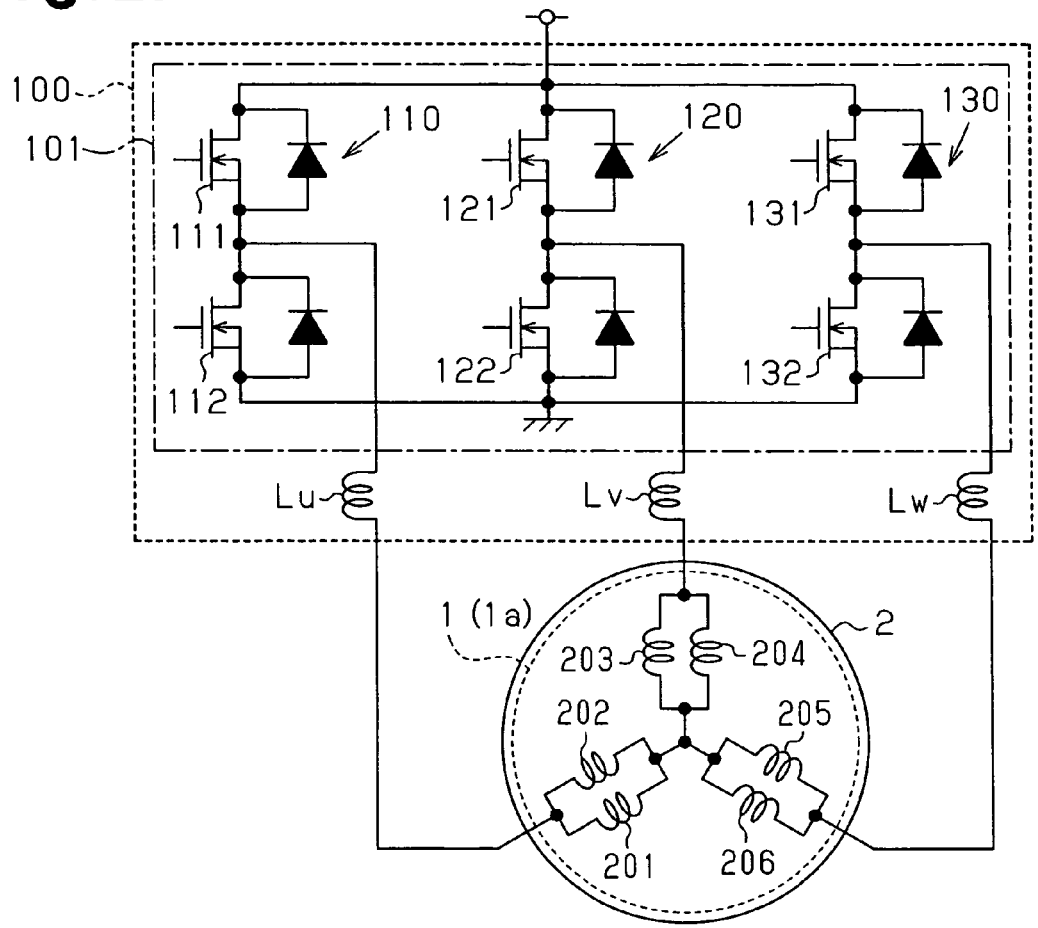
FIG. 27 is a schematic view of a controller for controlling current flow with respect to the armature winding of FIG. 2A.

A controller 100 shown in FIG. 27 determines the current flow in the armature winding 1 in accordance with the rotation amount of the rotor core 9.

Specifically, the controller 100 includes a drive circuit 101 connected to a pulse width modulation (PWM) circuit (not shown) serving as a control circuit. A PWM carrier frequency is set to about 10 kHz to about 40 kHz.

The drive circuit 101 includes three parallel circuits, a U-phase current flow circuit 110, a V-phase current flow circuit 120, and a W-phase current flow circuit 130. The parallel circuits 110, 120, and 130 each include one end connected to a power supply Vdc and another end connected to ground. The parallel circuits 110, 120, and 130 respectively include first switching elements 111, 121, and 131 and second switching elements 112, 122, and 132, which are connected in series with the first switching elements 111, 121, and 131. Each of the switching elements 111, 112, 121, 122, 131, and 132 receives a control signal output from the control circuit.

Each of the parallel circuits 110, 120, and 130 is connected to the armature winding 1 of the slotless motor 2 between the first switching elements 111, 121, 131 and the second switching element 112, 122, 132, respectively. Drive current is supplied to the slotless motor 2 as the switching element 111, 112, 121, 122, 131, 132 selectively switches between ON and OFF based on the control signal output from the control circuit. Therefore, current flow to the armature winding 1 is changed by the controller 100. When current flows through the armature winding 1, a rotational magnetic field is generated to rotate the rotor 4.

Figure 28A:
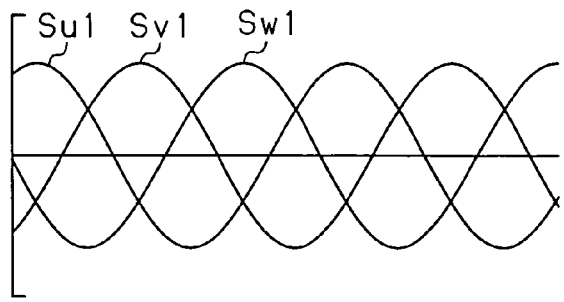
FIG. 28A and FIG. 28B are wave form charts of a drive current supplied to the armature winding of FIG. 2A.
Figure 28B:
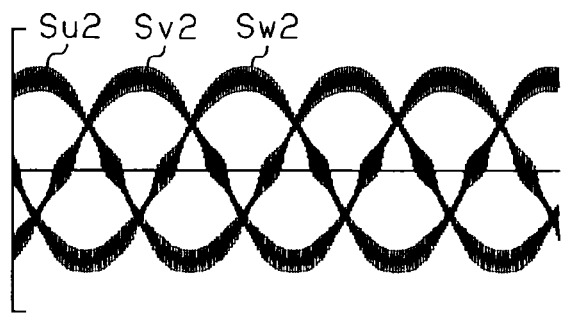

External inductances Lu, Lv, Lw formed by coils are arranged in the middle of each connecting line that connects the drive circuit 101 and the armature winding 1. The external inductances Lu, Lv, Lw have an inductance of about 10 to 100 times (few tens to few hundreds of microhenries (µH)) the inductance of the armature winding 1 (few microhenries (µH)). If the external inductances Lu, Lv, and Lw are omitted, the drive currents Su2, Sv2, Sw2 supplied to the armature winding 1 vibrate at the PWM carrier frequency, as shown in FIG. 28B. The arrangement of the inductances Lu, Lv, and Lw stabilizes the drive currents Su2, Sv2, and Sw2 supplied to the armature winding 1 (see FIG. 28A), as shown in FIG. 28A. Thus stably drives the slotless motor 2.

The armature winding 1 will now be described in detail.

Figure 2A:
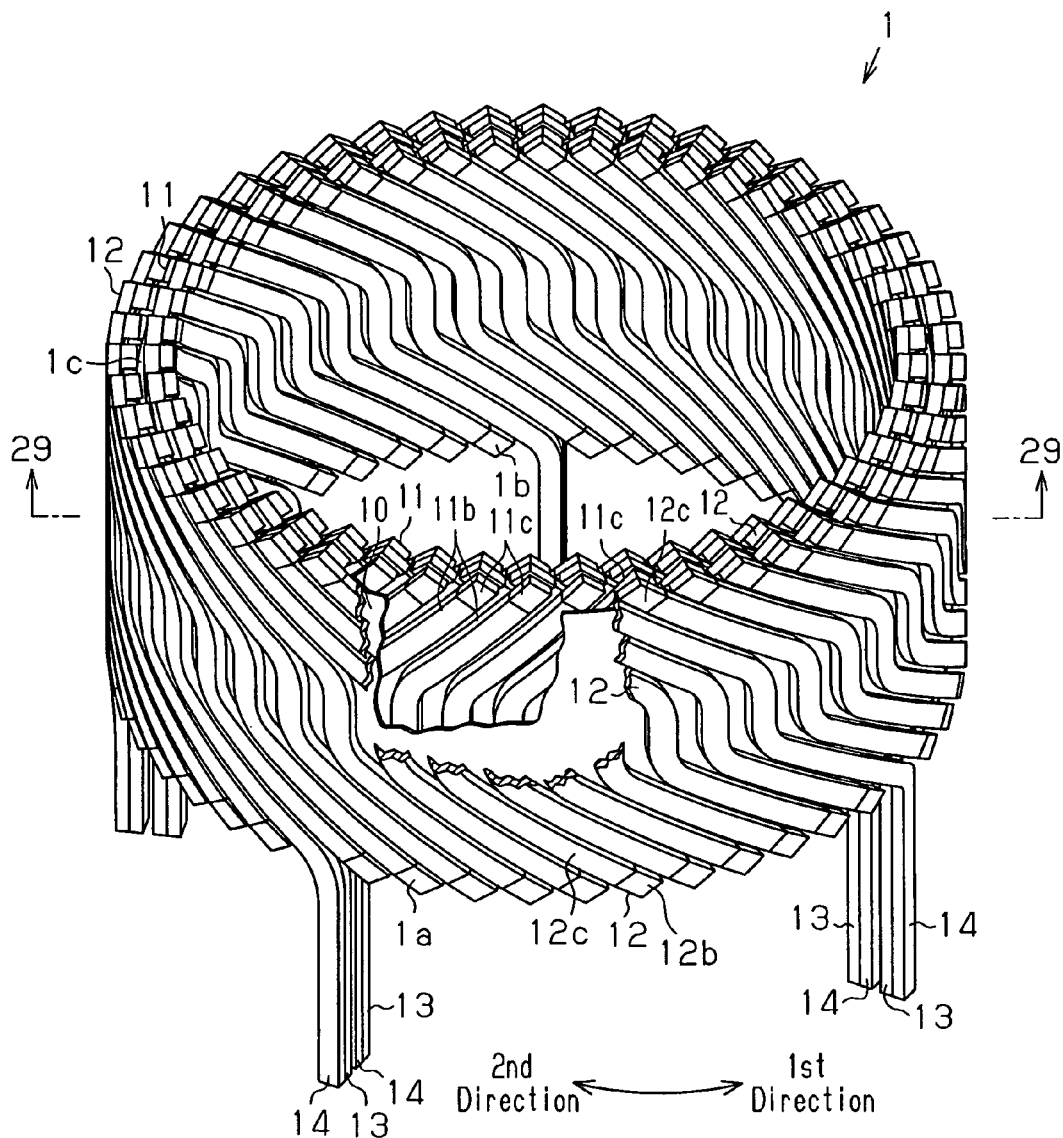
FIG. 2A is a perspective view showing an armature winding of the slotless motor of FIG. 1A.
Figure 2B:
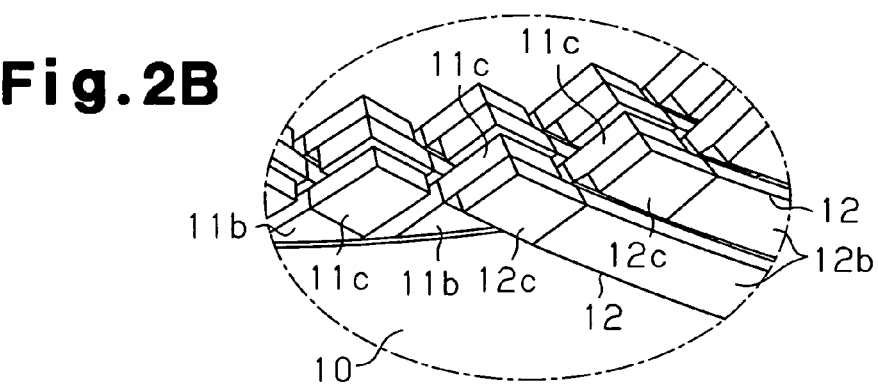
FIG. 2B is a partially enlarged view of FIG. 2A.

As shown in FIGS. 2A and 2B, the armature winding 1 includes a first armature winding 1a having a tubular shape, a second armature winding 1b having a tubular shape, and an insulating member 1c. The second armature winding 1b has an outer diameter slightly smaller than the inner diameter of the first armature winding 1a and is arranged coaxially with the first armature winding 1a. The insulating member 1c is arranged between the first armature winding 1a and the second armature winding 1b to insulate the first armature winding 1a and the second armature winding 1b from each other. The first armature winding 1a, the second armature winding 1b, and the insulating member 1c are integrated with one another.

The first armature winding 1a will now be described in detail. The second armature winding 1b has the same structure as the first armature winding 1a and thus will not be discussed.

Figure 3A:
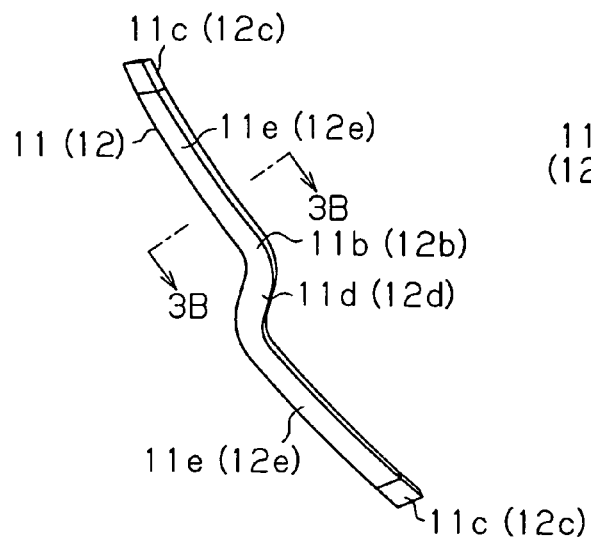
FIG. 3A is a perspective view showing a conductor of the armature winding of FIG. 2A.
Figure 3B:
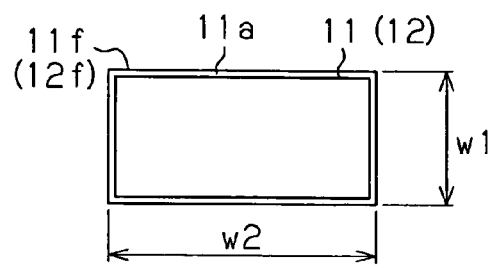
FIG. 3B is a cross-sectional view taken along line 3B-3B in FIG. 3A.

The first armature winding 1a includes a tubular member 10, a plurality of first conductors 11 arranged on the radially inner side of the tubular member 10, and a plurality of second conductors 12 arranged on the radially outer side of the tubular member 10. FIG. 3A is a perspective view showing the first conductor 11 (second conductor 12), and FIG. 3B is a cross-sectional view taken along line 3B-3B in FIG. 3A.

The tubular member 10 is thin and formed by a resin material such as plastic. The first conductors 11 are fixed to the inner circumferential surface of the tubular member 10 so as to be ring-shaped as a whole. The second conductors 12 are fixed to the outer circumferential surface of the tubular member 10 so as to be ring-shaped as a whole.

Figure 29:
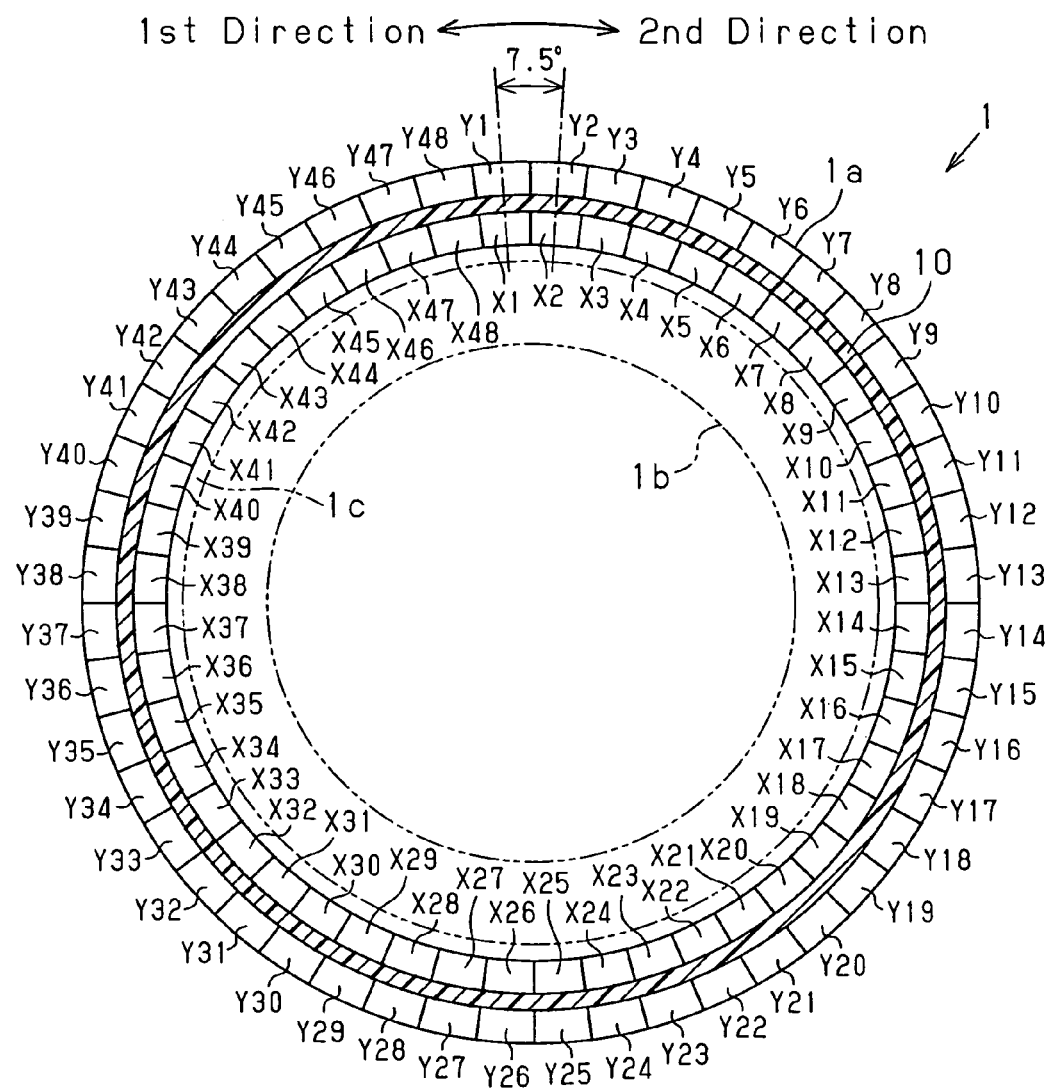
FIG. 29 is a cross-sectional view taken along line 29-29 in FIG. 2.

Specifically, as shown in FIG. 29, forty-eight first conductors 11 (X1-X48) are fixed to the inner circumferential surface of the tubular member 10, and forty-eight second conductors 12 (Y1-Y48) are fixed to the outer circumferential surface of the tubular member 10. In the same manner, the second armature winding 1b includes forty-eight first conductors 11 and forty-eight second conductors 12. Therefore, the armature winding 1 includes 192 conductors 11 and 12. The first conductors 11 (X1-X48) adjacent to each other in the circumferential direction of the tubular member 10 and the second conductors 12 (Y1-Y48) adjacent to each other in the circumferential direction of the tubular member 10 are shown in FIG. 29 in a state contacting each other but are actually arranged spaced apart from each other. The counterclockwise direction in FIG. 29 is hereinafter referred to as a first direction and the clockwise direction is referred to as a second direction.

The first conductors (X1-X48) are arranged at an equiangular interval, that is, at a 7.5° interval about the axis of the tubular member 10. The second conductors (Y1-Y48) are arranged at an equiangular interval, that is, at a 7.5° interval about the axis of the tubular member 10.

The first conductors 11 are made of an electrically conductive metal and a coating 11a serving as an insulator body is applied to the surfaces of each first conductor 11 at portions excluding the two ends, as shown in FIG. 3A and FIG. 3B. In other words, metal is exposed at the two ends of each first conductor 11 that are not covered by the coating 11a. The portion of each first conductor 11 covered by the coating 11a defines a first coated portion 11b, and the portion of each first conductor 11 where metal is exposed defines a first wire connection portion 11c. Each first conductor 11 includes a parallel portion 11d, extending parallel to the axis of the tubular member 10, and a pair of inclined portions 11e extending in opposite directions from the two ends of the parallel portion 11d and inclined with respect to the axis of the tubular member 10. The first conductors 11 adjacent in the circumferential direction of the tubular member 10 are positioned at bent portions defined between the parallel portion 11d and the inclined portions 11e. As shown in FIG. 2B, the first wire connection portion 11c of each first conductor 11 projects out of the end of the tubular member 10. In other words, the first wire connection portion 11c does not overlap the tubular member 10 in the radial direction of the tubular member 10.

In the same manner as the first conductor 11, the second conductors 12 are made of an electrically conductive metal and a coating 12a serving as an insulator is applied to the surfaces of each second conductor 12 at portions excluding the two ends, as shown in FIG. 3A and FIG. 3B. In other words, metal is exposed at the two ends of each second conductor 12 that are not covered by the coating 12a. The portion of each second conductor 12 covered by the coating 12a defines a second coated portion 12b, and the portion of each second conductor 12 where metal is exposed defines a second wire connection portion 12c. Each second conductor 12 includes a parallel portion 12d, extending parallel to the axis of the tubular member 10, and a pair of inclined portions 12e extending in opposite directions from the two ends of the parallel portion 12d and inclined with respect to the axis of the tubular member 10. The second conductors 12 adjacent in the circumferential direction of the tubular member 10 are positioned at bent portions defined between the parallel portion 12d and the inclined portions 12e. As shown in FIG. 2B, the second wire connection portion 12c of each second conductor 12 projects out of the end of the tubular member 10. In other words, the second wire connection portion 12c does not overlap the tubular member 10 in the radial direction of the tubular member 10.

As shown in FIG. 29, the parallel portion 11d of each first conductor 11 (X1-X48) is located at the same position in the circumferential direction of the tubular member 10 as the parallel portion 12d of the corresponding second conductor 12 (Y1-Y48). For instance, the parallel portion 11d of the first conductor X1 and the parallel portion 12d of the second conductor Y1 are located at the same positions in the circumferential direction of the tubular member 10, and the parallel portion 11d of the first conductor X2 and the parallel portion 12d of the second conductor Y2 are located at the same positions in the circumferential direction of the tubular member 10. Further, the parallel portions 11d of the first conductor 11s (X1-X48) in the first armature winding 1a is located at the same positions in the circumferential direction of the tubular member 10 as the parallel portions 11d and 12d of the corresponding first conductor 11 and the second conductor 12 in the second armature winding 1b. That is, the corresponding parallel portions 11d and 12d of the four conductors 11 and 12 are aligned in the radial direction of the tubular member 10.

As shown in FIG. 2A, the extending direction of the inclined portion 11e of each first conductor 11 differs from the extending direction of the inclined portion 12e of the corresponding second conductor 12. That is, the torsional direction (inclination direction) of each first conductor 11 is opposite the torsional direction (inclination direction) of the corresponding second conductor 12.

Figure 30:
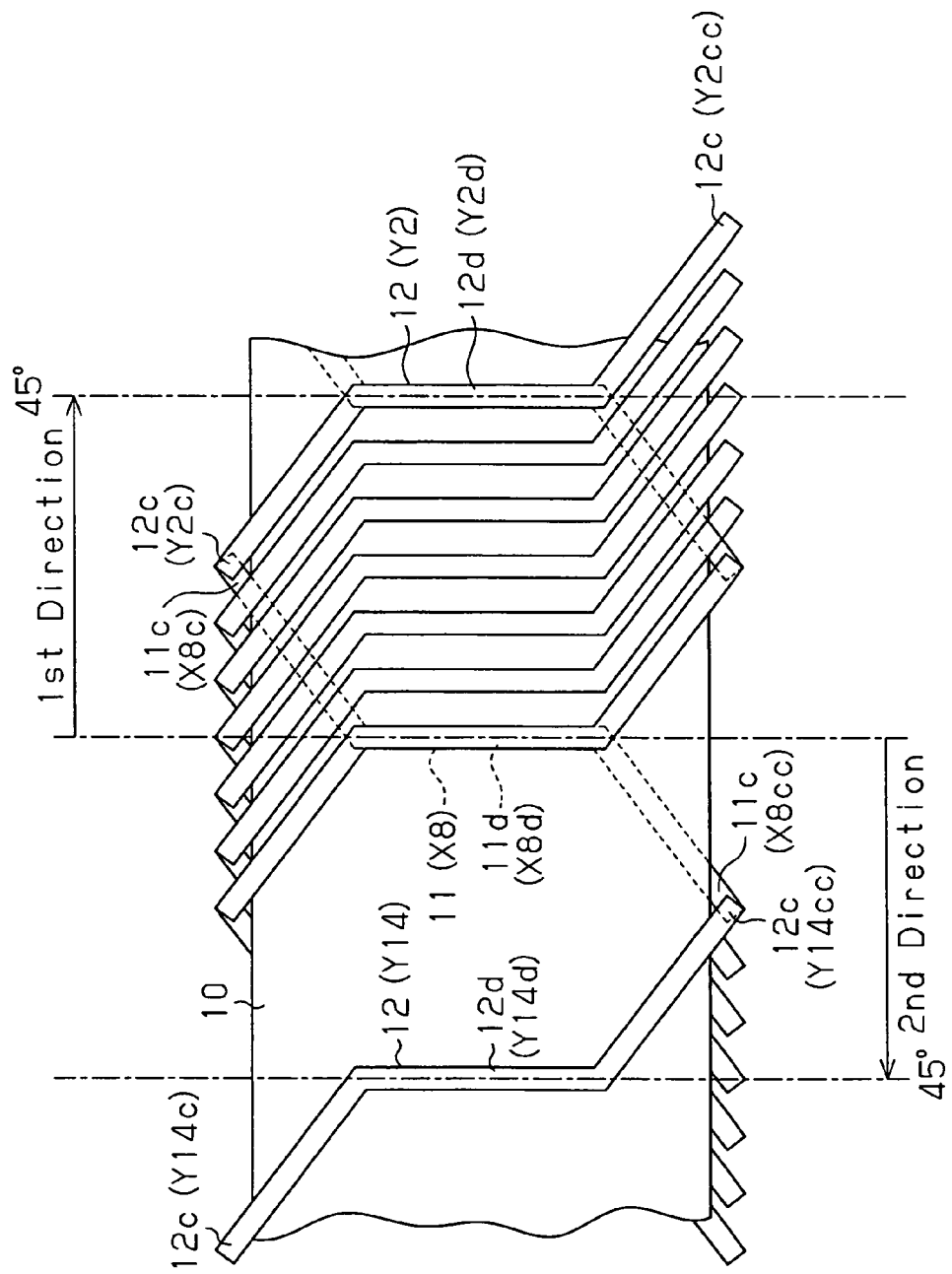
FIG. 30 is an enlarged view showing part of the armature winding of FIG. 2A.

Specifically, as shown in FIG. 30, in the radial direction of the tubular member 10, the first wire connection portion 11c at one end (upper end in FIG. 30) of each first conductor 11 faces toward the second wire connection portion 12c at one end (upper end in FIG. 30) of the second conductor 12 that includes the parallel portion 12d separated in the first direction (towards the right in FIG. 30) by 45° from the parallel portion 11d of the first conductor 11. Further, in the radial direction of the tubular member 10, the first wire connection portion 11c at the other end (lower end in FIG. 30) of each first conductor 11 faces toward the second wire connection portion 12c at the other end (lower end in FIG. 30) of the second conductor 12 that includes the parallel portion 12d separated in the second direction (towards the left in FIG. 30) by 45° from the parallel portion 11d of the first conductor 11. For instance, the first wire connection portion X8c of the first conductor X8 faces the second wire connection portion Y2c of the second conductor Y2 in the radial direction of the tubular member 10, and the first wire connection portion X8 cc of the first conductor X8 faces the second wire connection portion Y14cc of the second conductor Y14 in the radial direction of the tubular member 10.

The first wire connection portion 11c and the second wire connection portion 12c facing each other in the radial direction of the tubular member 10 are compression bonded. Therefore, each of the first conductors 11 is electrically connected to the corresponding pair of second conductors 12. With regards to the first conductor 11 and the second conductor 12 that are electrically connected by compression bonding the first wire connection portion 11c and the second wire connection portions 12c, one of the first conductor 11 and the second conductor 12 is located in the first direction from the compression bonding portion and the other one of the first conductor 11 and the second conductor 12 is located in the second direction side from the compression bonding portion. Thus, the first conductors 11 and the second conductors 12 are wound around the tubular member 10 by electrically connecting each of the first conductors 11 to the corresponding pair of second conductors 12.

The first conductor 11 and the second conductor 12 have rectangular cross-sections in which the size w1 in the radial direction of the tubular member 10 is smaller than the size w2 in the circumferential direction of the tubular member 10, as shown in FIG. 3B. The first wire connection portion 11c and the second wire connection portion 12c facing each other in the radial direction of the tubular member 10 are compression bonded so that the surface 11f of the first wire connection portion 11c having a width of size w2 and the surface 12f of the second wire connection portion 12c having the width of size w2 contact each other.

As described above, the first conductors 11 and the second conductors 12 each have rectangular cross-sectional shapes and thus have four corners. Therefore, the first conductor 11 and the second conductor 12 include at least four ridges corresponding to the corners.

As shown in FIG. 2A, six copper wire terminals extending parallel to the axis of the tubular member 10 are arranged in the first armature winding 1a at an equiangular interval about the axis of the tubular member 10. Each copper wire terminal includes a first copper wire terminal 13 and a second copper wire terminal 14. The first copper wire terminal 13 and the second copper wire terminal 14 electrically connect to the corresponding first wire connection portion 11c or the second wire connection portion 12c, respectively. The power supplied from the controller 100 shown in FIG. 27 is supplied to the first armature winding 1a via the copper wire terminals 13 and 14.

The wire connection of the first conductor 11 (X1-X48) and the second conductor 12 (Y1-Y48) will now be described.

As shown in FIG. 27, the first armature winding 1a includes first to sixth winding 201 to 206. The first to the sixth windings 201 to 206 are each formed by eight first conductors 11 and eight second conductors 12. Each winding 201 to 206 is shifted by 7.5° about the axis of the tubular member 10.

Figure 31:
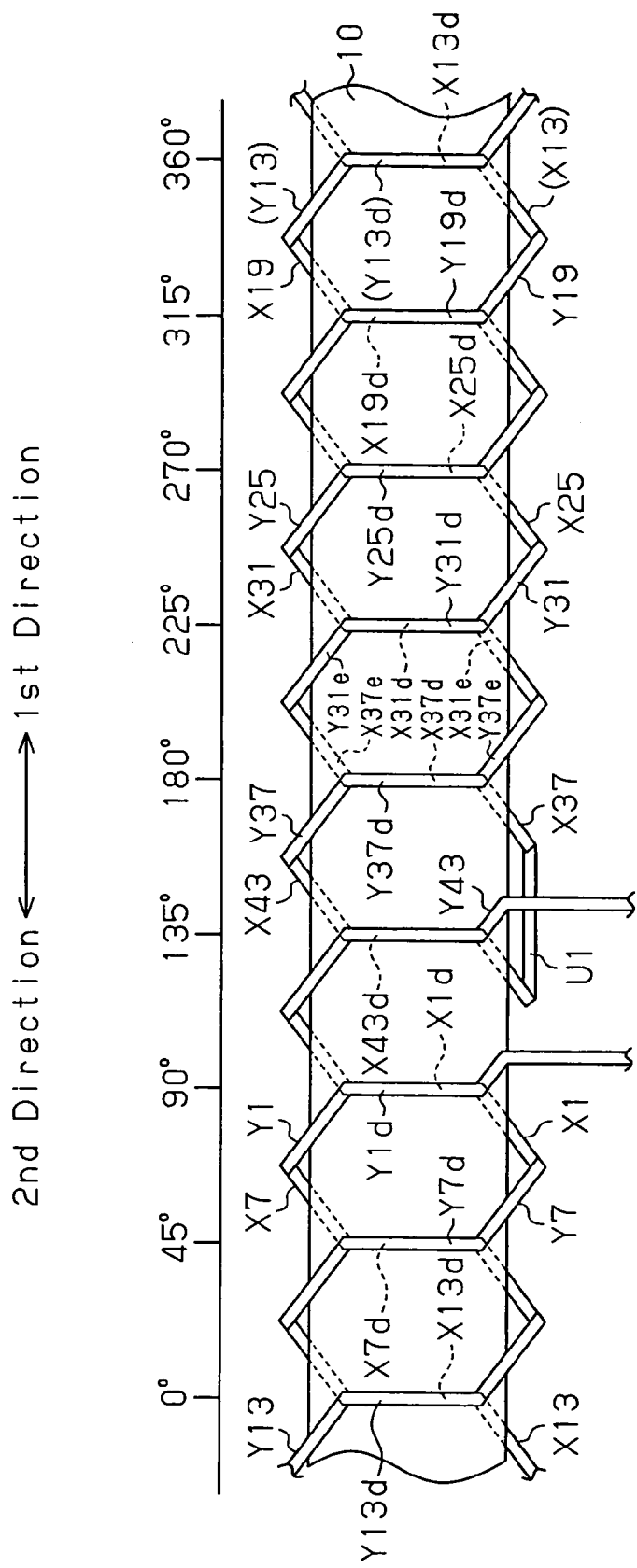
FIG. 31 is an explanatory diagram showing a method for connecting a first conductor and a second conductor of the armature winding of FIG. 2A.

Specifically, the first winding 201 includes first conductors X1, X7, X13, X19, X25, X31, X37, X43 and second conductors Y1, Y7, Y13, Y19, Y25, Y31, Y37, Y43 shown in FIG. 31, and is formed by connecting the corresponding first wire connection portions 11c and second wire connection portions 12c. In the following description, the term upper end and lower end of the first conductor 11 and the second conductor 12 is used. The upper end refers to the end located at the upper side in FIG. 31, and the lower end refers to the end located at the lower side in FIG. 31.

The upper end of the first conductor X7 including the parallel portion X7d separated by 45° in the second direction from the parallel portion Y1d of the second conductor Y1 is connected to the upper end of the second conductor Y1.

The lower end of the second conductor Y13 including the parallel portion Y13d separated by 45° in the second direction from the parallel portion X7d of the first conductor X7 is connected to the lower end of the first conductor X7.

The upper end of the first conductor X19 including the parallel portion X19d separated by 45° in the second direction from the parallel portion Y13d of the second conductor Y13 is connected to the upper end of the second conductor Y13.

The lower end of the second conductor Y25 including the parallel portion Y25d separated by 45° in the second direction from the parallel portion X19d of the first conductor X19 is connected to the lower end of the first conductor X19.

The upper end of the first conductor X31 including the parallel portion X31d separated by 45° in the second direction from the parallel portion Y25d of the second conductor Y25 is connected to the upper end of the second conductor Y25.

The lower end of the second conductor Y37 including the parallel portion Y37d separated by 45° in the second direction from the parallel portion X31d of the first conductor X31 is connected to the lower end of the first conductor X31.

The upper end of the first conductor X43 including the parallel portion X43d separated by 45° in the second direction from the parallel portion Y37d of the second conductor Y37 is connected to the upper end of the second conductor Y37. The parallel portion X1d of the first conductor X1 is separated by 45° in the second direction from the parallel portion X43d of the first conductor X43.

The lower end of the first conductor X37 including the parallel portion X37d separated by 45° in the first direction from the parallel portion X43d of the first conductor X43 is connected to the lower end of the first conductor X43 by way of a U-phase wire connection portion U1. That is, the winding direction changes at this point. The parallel portion X37d of the first conductor X37 and the parallel portion Y37d of the second conductor Y37 are arranged aligned in the radial direction of the tubular member 10.

The upper end of the second conductor Y31 including the parallel portion Y31d separated by 45° in the first direction from the parallel portion Y37d of the first conductor X37 is connected to the upper end of the first conductor X37.

The lower end of the first conductor X25 including the parallel portion X25d separated by 45° in the first direction from the parallel portion Y31d of the second conductor Y31 is connected to the lower end of the second conductor Y31.

The upper end of the second conductor Y19 including the parallel portion Y19d separated by 45° in the first direction from the parallel portion Y25d of the first conductor X25 is connected to the upper end of the first conductor X25.

The lower end of the first conductor X13 including the parallel portion X13d separated by 45° in the first direction from the parallel portion Y19d of the second conductor Y19 is connected to the lower end of the second conductor Y19.

The upper end of the second conductor Y7 including the parallel portion Y7d separated by 45° in the first direction from the parallel portion X13d of the first conductor X13 is connected to the upper end of the first conductor X13.

The lower end of the first conductor X1 including the parallel portion X1d separated by 45° in the first direction from the parallel portion Y7d of the second conductor Y7 is connected to the lower end of the second conductor Y7.

The upper end of the second conductor Y43 including the parallel portion Y43d separated by 45° in the first direction from the parallel portion X1d of the first conductor X1 is connected to the upper end of the first conductor X1.

In this manner, the first conductors X1, X7, X13, X19, X25, X31, X37, X43 and the second conductors Y1, Y7, Y13, Y19, Y25, Y31, Y37, Y43 are connected. Eight conductors having a substantially circuit-like shape when seen from the outer side in the radial direction of the tubular member 10 are formed by the first conductors X1, X7, X13, X19, X25, X31, X37, X43 and the second conductors Y1, Y7, Y13, Y19, Y25, Y31, Y37, Y43, as shown in FIG. 31. The circuit-like conductors are aligned along the circumferential direction of the tubular member 10. For example, a substantially hexagonal circuit-shaped conductor is formed by the parallel portion X31d of the first conductor X31 and the inclined portion 31e at the lower end of the parallel portion X31d, the parallel portion X37d of the first conductor X37 and the inclined portion 37e at the upper end of the parallel portion X37d, the parallel portion Y31d of the second conductor Y31 and the inclined portion Y31e at the upper end of the parallel portion Y31d, and the parallel portion Y37d of the second conductor Y37 and the inclined portion Y37e at the lower end of the parallel portion Y37d. That is, one circuit-like conductor is formed by the first conductors X31, X37 and the second conductors Y31, Y37. When current flows through each circuit-like conductor, different magnetic poles are formed at the adjacent circuit-like conductors in the circumferential direction of the tubular member 10. In other words, the first conductors X1, X7, X13, X19, X25, X31, X37, X43 and the second conductors Y1, Y7, Y13, Y19, Y25, Y31, Y37, Y43, which are connected as described above, form the first winding 201 having eight magnetic poles arranged at an equiangular interval about the axis of the tubular member 10.

In the same manner, the second winding 202 is formed by connecting the eight first conductors X2, X8, X14, X20, X26, X32, X38, and X44 and the eight second conductors Y2, Y8, Y14, Y20, Y26, Y32, Y38, and Y44.

The third winding 203 is formed by connecting the eight first conductors X3, X9, X15, X21, X27, X33, X39, and X45 and the eight second conductors Y3, Y9, Y15, Y21, Y27, Y33, Y39, and Y45.

The fourth winding 204 is formed by connecting the eight first conductors X4, X10, X16, X22, X28, X34, X40, and X46 and the eight second conductors Y4, Y10, Y16, Y22, Y28, Y34, Y40, and Y46.

The fifth winding 205 is formed by connecting the eight first conductors X5, X11, X17, X23, X29, X35, X41, and X47 and the eight second conductors Y5, Y11, Y17, Y23, Y29, Y35, Y41, and Y47.

The sixth winding 206 is formed by connecting the eight first conductors X6, X12, X18, X24, X30, X36, X42, and X48 and the eight second conductors Y6, Y12, Y18, Y24, Y30, Y36, Y42, and Y48.

Figure 32:
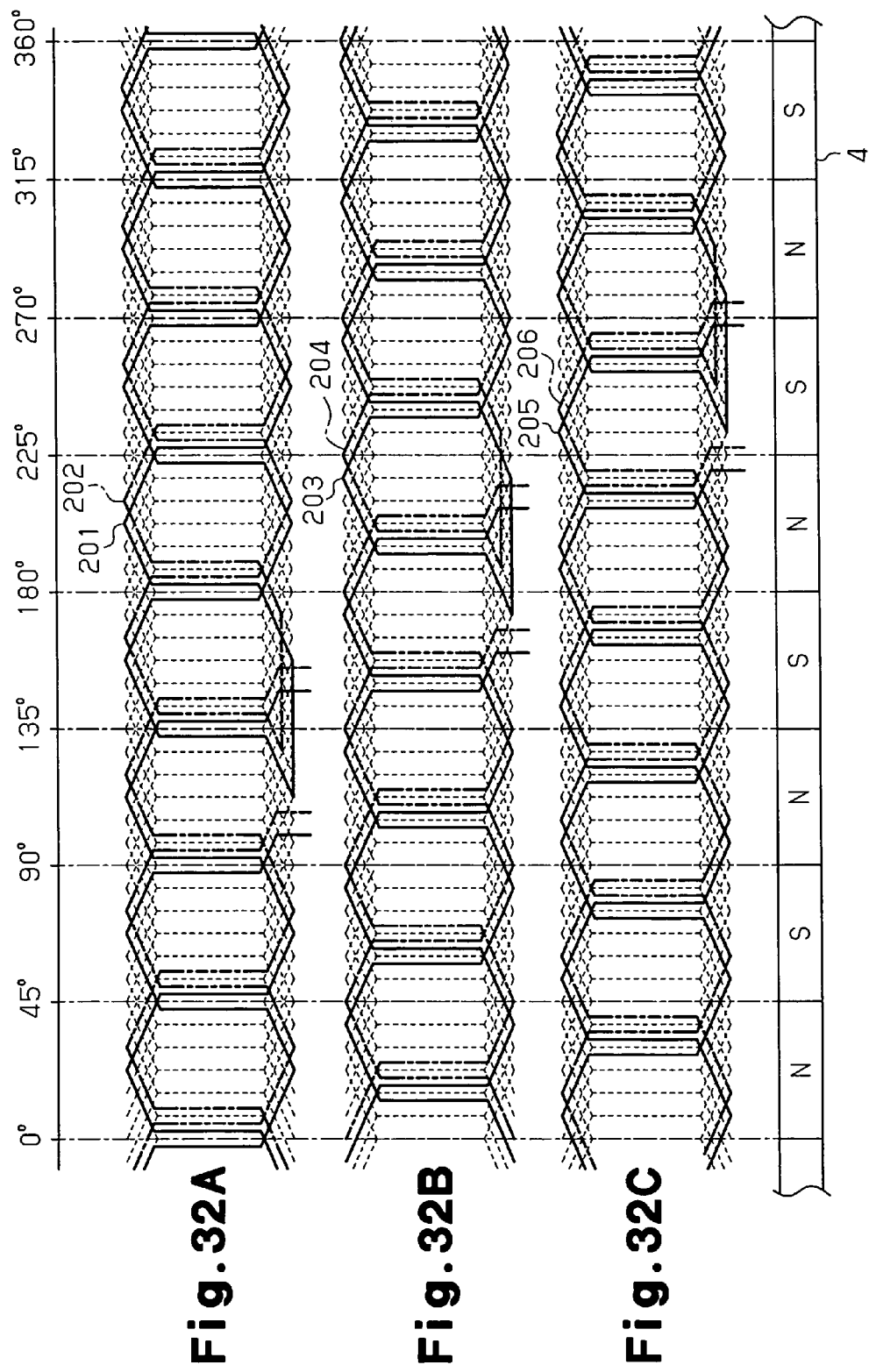
FIGS. 32A, 32B, and 32C are wire connection diagrams of the armature winding of FIG. 2A.

The first winding 201 and the second winding 202 are adjacent to each other in the circumferential direction of the tubular member 10 and are connected so as to have the same phase, as shown in FIG. 27. The third winding 203 and the fourth winding 204 are adjacent to each other in the circumferential direction of the tubular member 10 and are connected so as to have the same phase, as shown in FIG. 27. The fifth winding 205 and the sixth winding 206 are adjacent to each other in the circumferential direction of the tubular member 10 and are connected so as to have the same phase, as shown in FIG. 27. The U phase winding is formed by the first winding 201 and the second winding 202 that are connected in parallel. The V phase winding is formed by the third winding 203 and the fourth winding 204 that are connected in parallel. The W phase winding is formed by the fifth winding 205 and the sixth winding 206 that are connected in parallel. Therefore, the U phase, V phase, and W phase windings are arranged shifted from one another by 15° about the axis of the tubular member 10, as shown in FIG. 32A, FIG. 32B, and FIG. 32C. The U phase, V phase, and W phase windings are formed by a total of thirty-two conductors, or sixteen first conductors 11 and sixteen second conductors 12.

The procedures for manufacturing the armature winding 1 will now be described with reference to the flowchart of FIG. 5.

Figure 4A:
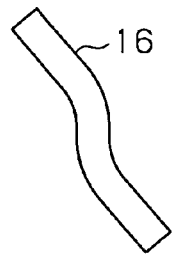
FIGS. 4A to 4D are explanatory views showing the manufacturing procedures for the armature winding of FIG. 2A.
Figure 4B:
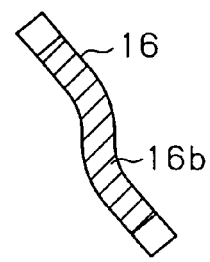

First, the first conductor 11 and the second conductor 12 are formed. Specifically, in step S101, a thin conductor plate (e.g., copper plate) is punched into a substantially S shape to form a conductor strip 16 (see FIG. 4A) shown in FIG. 4A including parallel portions 11d, 12d, and a pair of inclined portions 11e, 12e. In step S102, a coating 16b is applied to the surface of each conductor strip 16 at portions excluding the two ends, as shown in FIG. 4B. This obtains the first conductor 11 and the second conductor 12.

Figure 4C:
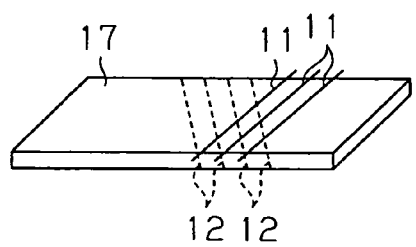

In the subsequent step S103, the first conductor 11 and the second conductor 12 is adhered to or embedded in the two surfaces of a plate member 17 made of resin such as plastic, as shown in FIG. 4C.

Figure 4D:
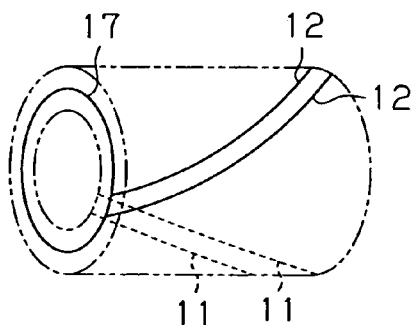

In step S104, a tubular shape is formed with the plate member 17, to which the first conductor 11 and the second conductor 12 are fixed, as shown in FIG. 4D. When forming a tubular shape with the plate member 17, the first conductor 11 and the second conductor 12 are deformed accordingly and slightly curved.

In step S105, the first wire connection portion 11c of each first conductor 11 fixed to the plate member 17 is compression bonded to the second wire connection portion 12c of the corresponding second conductor 12. This electrically connects the first conductor 11 and the second conductor 12 thereby forming the first armature winding 1a (second armature winding 1b).

In subsequent step S106, the first copper wire terminal 13 and the second copper wire terminal 14 are electrically connected to the corresponding first wire connection portion 11c or the second wire connection portion 12c of the first armature winding 1a (second armature winding 1b), respectively. The connection of the first and second copper wire terminals 13, 14 with respect to the first wire connection portion 11c or the second wire connection portion 12c may be carried out before forming a tubular shape with the plate member 17.

Figure 7:
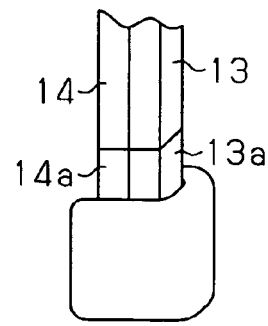
FIG. 7 is a schematic view showing another example of a method for electrically connecting the copper wire terminals of the armature winding of FIG. 2A.

In step S107, the first armature winding 1a and the second armature winding 1b are arranged concentric to each other, and the insulating member 1c is arranged between the first armature winding 1a and the second armature winding 1b. Further, each of the first copper wire terminals 13 is electrically connected to the corresponding second copper wire terminal 14. The electrical connection between the copper wire terminals 13, 14 may be carried out by compression bonding the distal ends 13a, 13b of the copper wire terminals 13, 14, which are not covered by an insulator, to a terminal member 15, as shown in FIG. 6, or may be carried out by adhering the distal ends 13a, 13b through soldering or welding, as shown in FIG. 7.

The armature winding 1 shown in FIG. 2A is formed through the above procedures. The obtained armature winding 1 is fixed by an adhesive agent to the inner circumferential surface of the cylindrical core 3a to form the armature 3. A conductor plate may be laminated to the plate member 17 before forming a tubular shape with the plate member 17 to which the first conductor 11 and the second conductor 12 are fixed. In this case, when the plate member 17 is formed into a tubular shape, the conductor plate is deformed and shaped into a tubular shape accordingly. As a result, the conductor plate functions as the core 3a.

Thereafter, in step S108, the armature 3 is fixed in the yoke 6 to obtain the slotless motor 2 shown in FIG. 1A. The connection of the first and second copper wire terminals 13, 14 with respect to the first wire connection portion 11c or the second wire connection portion 12c may be performed after fixing the armature winding 1 to the yoke 6.

The present embodiment has the advantages described below.

The coating 11a, which is an insulator, is applied to the surface of each first conductor 11 at portions excluding the two ends. This reduces the space between the first conductors 11 that are adjacent to each other in the circumferential direction of the tubular member 10, and the first conductors 11 are densely arranged at the radially inner side of the tubular member 10.

The coating 12a, which is an insulator, is applied to the surface of each second conductor 12 at portions excluding the two ends. This reduces the space between the second conductors 12 that are adjacent to each other in the circumferential direction of the tubular member 10, and the second conductors 12 are densely arranged at the radially outer side of the tubular member 10.

The strips made of copper foil disclosed in Japanese Laid-Open Patent Publication No. 8-322221 is not coated by an insulator. In the present embodiment, however, each of the first conductors 11 includes the first coated portion 11b, which is coated by the coating 11a, and each of the second conductors 12 includes the second coated portion 12b, which is coated by the coating 12a. Thus, the first conductor 11 and the second conductor 12 receive a large amount of current compared to the copper foil pattern. This enables the output of the slotless motor 2 to be increased.

The armature winding 1 of the present embodiment is easy to manufacture compared to when it is formed when the winding is wound from end to end.

The magnetic line of force produced by the armature 3 of the present embodiment has the same distribution as the magnetic line of force produced by the armature including an armature winding of distributed winding since the torsional directions (inclination direction) of the first conductor 11 and the second conductor 12 are different. Thus, the level distribution of the magnetic line of force produced at the armature 3 is gradual and torque variations are reduced.

Each of the first conductors 11 includes a pair of the inclined portions 11e, extending to incline relative to the axis of the tubular member 10, and the parallel portion 11d, extending parallel to the axis of the tubular member 10. Thus, the first conductors 11 adjacent in the circumferential direction of the tubular member 10 may be positioned in the axial direction of the tubular member 10 by using the bent portion between the inclined portion 11e and the parallel portion 11d as a reference.

Each of the second conductors 12 includes a pair of the inclined portions 12e, inclined relative to the axis of the tubular member 10, and the parallel portion 12d, extending parallel to the axis of the tubular member 10. Thus, the second conductors 12 adjacent in the circumferential direction of the tubular member 10 may be positioned in the axial direction of the tubular member 10 by using the bent portion between the inclined portion 12e and the parallel portion 12d as a reference.

The first conductor 11 and the second conductor 12 have a rectangular cross-section in which the size w1 in the radial direction of the tubular member 10 is smaller than the size w2 in the circumferential direction of the tubular member 10. The size of the armature winding 1 in the radial direction of the tubular member 10 is thus reduced. A plurality of armature windings 1 may be concentrically superimposed in a simple manner to further increase the motor output.

The first conductor 11 and the second conductor 12 have a rectangular cross-section including four corners, and include four ridges corresponding to each corner. The orientation of the first conductor 11 and the second conductor 12 with respect to the tubular member 10 is stabilized by the ridges. Therefore, the attachment of the first conductor 11 and the second conductor 12 to the tubular member 10 is facilitated, and a jig for maintaining stable orientation of the first conductor 11 and the second conductor 12 does not need to be used.

The first conductor 11 and the second conductor 12 may easily be fixing together by fixing the first conductor 11 and the second conductor 12 to the plate member 17 and then forming a tubular shape with the plate member 17 to obtain the tubular member 10.

The electrical connection between the first conductor 11 and the second conductor 12 is performed after forming a tubular shape with the plate member 17. Thus, the first conductor and the second conductor do not become disconnected while forming a tubular shape with the plate member 17.

The first armature winding 1a and the second armature winding 1b are concentrically arranged, and then the first and second copper wire terminals 13, 14 are connected to the first wire connection portion 11c and the second wire connection portion 12c. Thus, the connection of the copper wire terminals 13, 14 connecting to the first armature winding 1a and the connection of the copper wire terminals 13, 14 connecting to the second armature winding 1b are performed at the same time.

The first wire connection portion 11c and the second wire connection portion 12c project out of the edges of the tubular member 10. Thus, the connection of the first wire connection portion 11c and the second wire connection portion 12c is facilitated.

The external inductances Lu, Lv, Lw are arranged in each connecting line that connects the drive circuit 101 of the controller 100 and the first to the sixth windings 201 to 206 of the armature winding 1. This stabilizes the driving of the motor 2.

The first embodiment may be modified as described below.

The armature winding 1 is fixed to the stator (case 5) in the first embodiment. However, the armature winding 1 may be arranged on the rotor 4. More specifically, the armature winding 1 may be arranged on the rotor of a direct current slotless motor incorporating brush and changing current flow with the brush when the rotor is rotated.

In the first embodiment, with regards to the first conductor 11 and the second conductor 12 being electrically connected by compression bonding the first wire connection portion 11c and the second wire connection portion 12c, either one of the first conductor 11 and the second conductor 12 is located in the first direction side from the compression bonded portion, and the other one of the first conductor 11 and the second conductor 12 is located in the second direction from the compression bonded portion. However, the present invention is not limited in this manner. The first conductor 11 and the second conductor 12 may both be located in the first direction side or the second direction from the compression bonded portion as long as the first conductor 11 and the second conductor 12 are completely aligned with respect to each other.

The first conductor 11 and the second conductor 12 are formed by the parallel portion 11d, 12d and the inclined portions 11e, 12e in the first embodiment. However, the present invention is not limited in this manner. For example, the first conductor 11 and the second conductor 12 do not have to include the parallel portions 11d and 12d and may be inclined along the entire length with respect to the axis of the tubular member 10. In this case, the portion inclined with respect to the axis of the tubular member 10 is elongated. This produces a stronger magnetic line of force and increases the output of the slotless motor.

Figure 8:
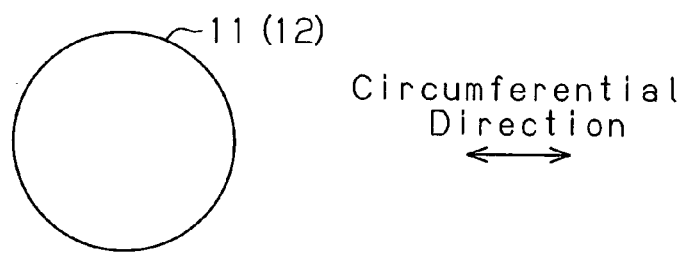
Figure 9:
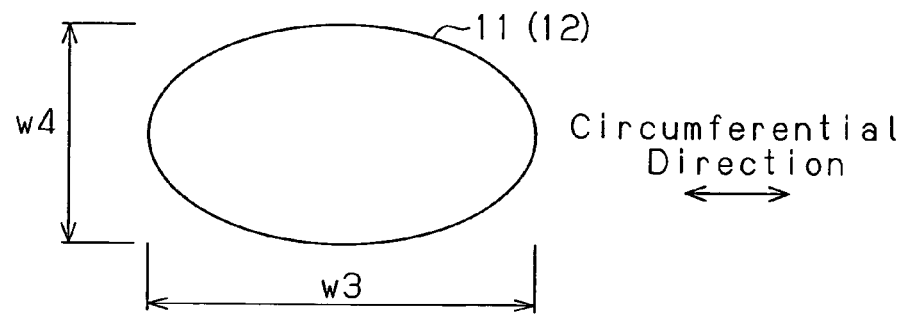

The cross-sectional shape of the first conductor 11 and the second conductor 12 is rectangular in the first embodiment. However, the present invention is not limited in this manner. The cross-sectional shape of the first conductor 11 and the second conductor 12 may be square. Alternatively, the cross-sectional shape may be a circle as shown in FIG. 8, or an ellipse as shown in FIG. 9. If the cross-sectional shape of the first conductor 11 and the second conductor 12 is a circle, processing is facilitated since the cross-sectional shape does not have directivity. If the cross-sectional shape of the first conductor 11 and the second conductor 12 is a circle or an ellipse, the first wire connection portion 11c and the second wire connection portion 12c are thicker at a middle part than at the ends with respect to the circumferential direction of the tubular member 10, and the first wire connection portion 11c and the second wire connection portion 12c contact each other at the middle part in the circumferential direction of the tubular member 10. This facilitates electrical connection of the first conductor 11 and the second conductor 12 through compression bonding or soldering. If the cross-sectional shape of the first conductor 11 and the second conductor 12 is an ellipse as shown in FIG. 9, the cross-section of the first conductor 11 and the second conductor 12 has the size w4 in the radial direction of the tubular member 10 that is smaller than the size w3 in the circumferential direction of the tubular member 10. Thus, the size of the armature winding 1 in the radial direction of the tubular member 10 is reduced compared to when the cross-sectional shape of the first conductor 11 and the second conductor 12 is a circle.

Alternatively, the cross-sectional shape of the first conductor 11 and the second conductor 12 may be a crescent and include two corners as shown in FIG. 10A to FIG. 10C or may be triangular or generally triangular and include three corners as shown in FIG. 11A to FIG. 1C. Further, the cross-sectional shape may be generally square and include four corners, as shown in FIG. 12A to FIG. 12D.

Figure 13:
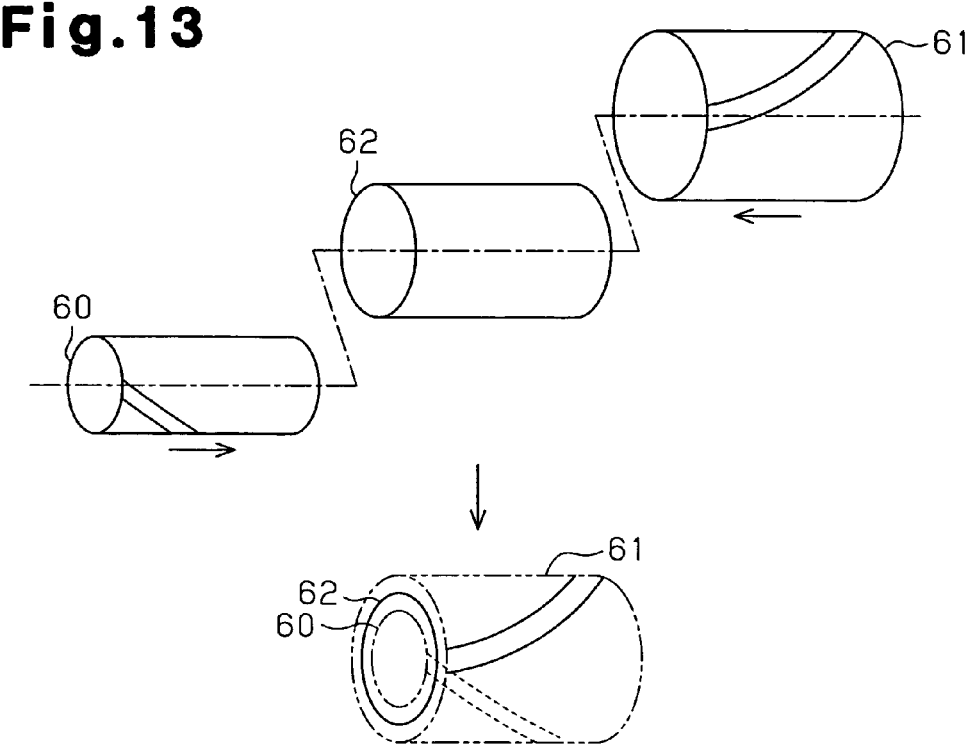
FIG. 13 is a schematic view showing the manufacturing procedures for an armature winding according to a further modification of the present invention.
Figure 14:
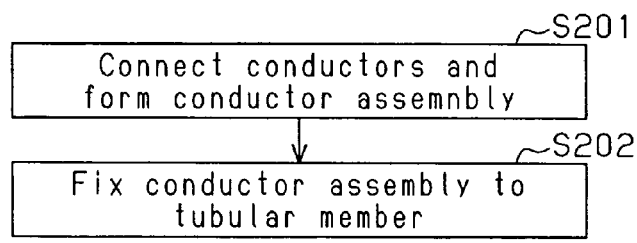
FIG. 14 is a flowchart showing the manufacturing procedures for the armature winding shown in FIG. 13.

The first conductor 11 and the second conductor 12 are fixed to the plate member 17 and then a tubular shape is formed with the plate member 17 in the first embodiment. However, the present invention is not limited in this manner. The armature winding 1 may be manufactured through the following steps. As shown in FIG. 13 and FIG. 14, first in step S201, the first conductors 11 are connected to form a tubular first conductor assembly 60, and the second conductors 12 are connected to form a tubular second conductor assembly 61.

Subsequently, in step S202, the first conductor assembly 60 and the second conductor assembly 61 are fixed to a tubular member 62. When fixing the first conductor 11 and the second conductor 12 to the plate member 17 and then forming a tubular shape with the plate member 17, the first conductor 11 and the second conductor 12 may fall off from the plate member 17 when forming the tubular shape with the plate member 17. However, this does not occur in this modification. The fixing of the first conductor 11 and the second conductor 12 to the tubular member 62 is ensured.

Figure 15:
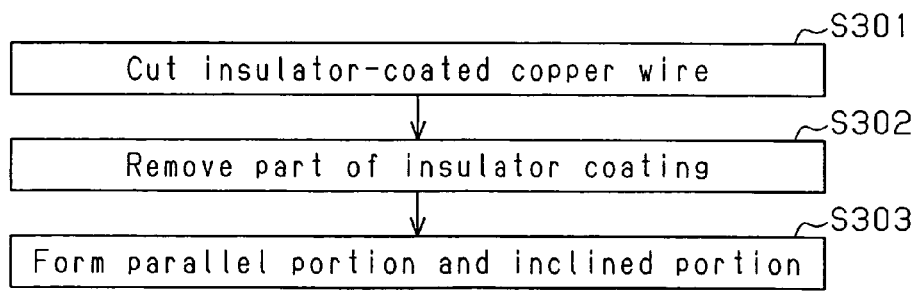
FIG. 15 is a flowchart showing the manufacturing procedures for the armature winding in another modification of the present invention.

The first conductor 11 and the second conductor 12 may be formed from a copper wire coated by an insulator instead of being formed from a thin conductor plate. In this case, a copper wire coated by an insulation coating is first cut to a predetermined length in step S301, as shown in FIG. 15. Next, in step S302, the insulation coating at both ends of the cut copper wire is removed to form the wire connection portion 11c, 12c (see FIG. 2) with metal exposed at both ends of the copper wire. In step S303, the copper wire is bent to form the parallel portion 11d, 12d (see FIG. 2) and the inclined portions 11e, 12e (see FIG. 2). The first conductor 11 and the second conductor 12 are obtained from the copper wire coated by an insulation coating in this manner.

The armature winding 1 is not limited to a double layer structure and may be a single layer structure or a multilayer structure of three or more layers.

The tubular member 10 may be formed by impregnating insulative material into or vapor depositing insulative powder onto the surface of a thin metal cylinder or may be formed from an insulation sheet instead of being formed from resin material such as plastic.

Figure 16:
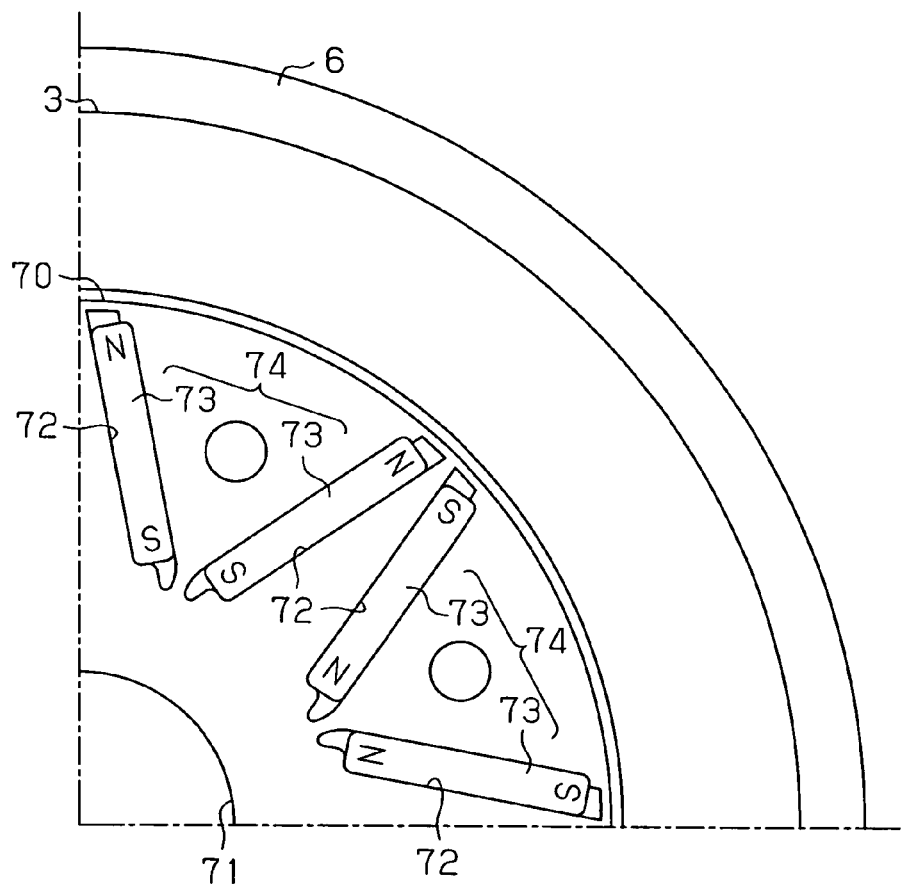
FIG. 16 is a cross-sectional view of a rotor core in a further modification of the present invention.

A surface permanent magnet type rotor core 9, in which the permanent magnets 9a are arranged on the surface of the rotor core 9, is employed in the first embodiment. However, an embedded magnet type rotor core may be employed instead. FIG. 16 is a cross-sectional view of an embedded magnet type rotor core 70. As shown in FIG. 16, the rotor core 70 has a generally cylindrical shape. A center hole 71 extends through the rotor core 70 between the generally central portions of the two end surfaces of the rotor core 70, and an output shaft 8 is inserted through the center hole 71. The rotor core 70 is formed by superimposing a plurality of disk-shaped core sheets. Eight permanent magnet pairs 74 arranged at an equiangular interval about the axis of the rotor core 70 are embedded in the rotor core 70. Each permanent magnet pair 74 has a substantially V-shaped cross-section so that its apex faces toward a radially inner side of the rotor core 70. Each permanent magnet pair 74 includes a pair of permanent magnets 73, and each permanent magnet 73 is accommodated in an accommodating hole 72 extending through the rotor core 70 and parallel to the axis of the rotor core 70. The N poles and the S poles of the permanent magnets 73 are located next to each other in each of the permanent magnet pairs 74. The S poles in each permanent magnet pair 74 is located next to the N poles of the permanent magnet pair 74 that is adjacent in the circumferential direction of the rotor core 70. The permanent magnet pairs 74 may be in any quantity as long as the quantity of magnetic poles is the same in each of the windings 201 to 206.

The U phase, V phase, and W phase windings are each formed by thirty-two conductors (sixteen first conductors 11 and sixteen second conductors 12) in the first embodiment. However, the present invention is not limited in such a manner. The winding of each phase may be formed by any number of conductors as long as the same number of magnetic poles as the rotor 4 (eight in the first embodiment) may be formed. Eight magnetic poles may be formed if the number of conductors forming the winding of each phase is at least sixteen (eight first conductors 11 and eight second conductors 12).

The number of magnetic poles of each phase of the armature winding 1 (first armature winding 1a, second armature winding 1b) may differ from the number of permanent magnets 9a by changing the waveform of the drive current that flows through the armature winding (first armature winding 1a, second armature winding 1b) when position detection of the rotor 4 is performed.

In the first embodiment, the first conductor 11 and the second conductor 12 are wound in a distributed winding so that the number of poles for each phase is eight. However, the first conductor 11 and the second conductor 12 may be wound in a concentrated winding so that the number of poles for each phase is one.

A second embodiment of the present invention will now be described with reference to the drawings. The second embodiment differs from the first embodiment in that the first conductor 11 and the second conductor 12 are formed by a conductor 18 shown in FIG. 17A and FIG. 17B. The structure of the conductor 18 will now be described.

Figure 17A:
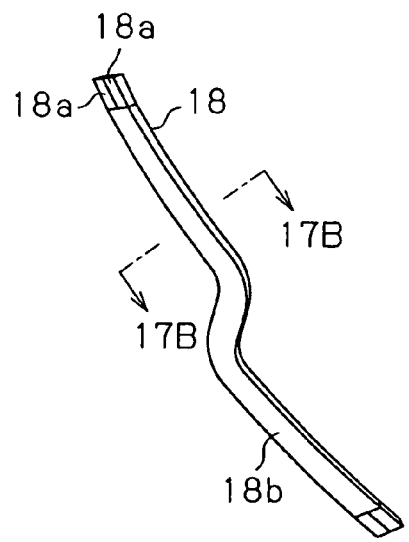
FIG. 17A is a perspective view of a conductor according to a second embodiment of the present invention.
Figure 17B:
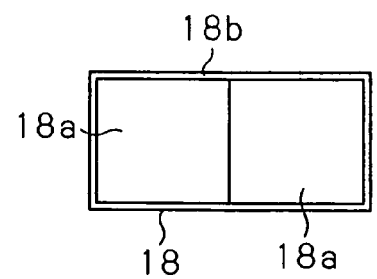
FIG. 17B is a cross-sectional view taken along line 17B-17B in FIG. 17A.

As shown in FIGS. 17A and 17B, the conductor 18 includes two conductor strips 18a extending together along the circumferential direction of the tubular member 10. Each conductor strip 18a extends in a direction that differs from the circumferential direction of the tubular member 10. The two conductor strips 18a forming each conductor 18 are fixed to each other by an adhesive agent and coated by a coating 18b. Each conductor strip 18a may be coated by a coating. The cross-sectional shape of each conductor 18, which is obtained by combining the cross-sectional shape of the two conductor strips 18a, is a rectangle in which the longitudinal direction coincides with the circumferential direction of the tubular member 10 in the second embodiment. The cross-sectional shape of each conductor strip 18a may be a circle. Further, the number of conductor strips 18a configuring each conductor 18 may be greater than or equal to three.

The second embodiment has the advantages described below in addition to the advantages of the first embodiment.

Since the conductor 18 is formed by a plurality of conductor strips 18a, the area of each conductor through which the rotor magnetic flux passes is reduced. Thus, the eddy current loop becomes smaller. Therefore, eddy current loss caused by the rotor magnetic flux is reduced.

Generally, the effective cross-sectional area is decreased due to current concentration at the surface of the conductor when high frequency AC current flows through the conductor (skin effect). When the first conductor 11 and the second conductor 12 are formed by the conductor 18 of FIG. 17A, however, the surface area of the first conductor 11 and the second conductor 12 increases since the conductor 18 is formed by a plurality of conductor strips 18a. Thus, the effective cross-sectional area increases even though the cross-sectional area of the first conductor 11 and the second conductor 12 does not increase. This prevents the effective cross-sectional area from being decreased by the skin effect.

Figure 18:
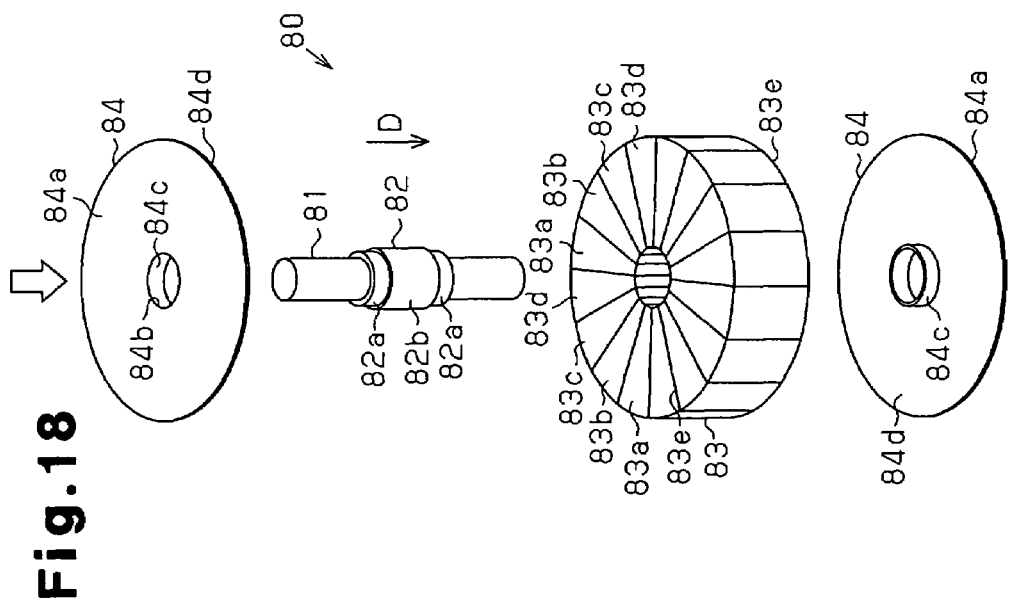
FIG. 18 is an exploded perspective view of a rotor according to a third embodiment of the present invention.

A third embodiment of the present invention will now be described with reference to the drawings. The third embodiment differs from the first embodiment in that a rotor 80 shown in FIG. 18 is used instead of the rotor 4 shown in FIG. 1A. The structure of the rotor 80 will now be described.

The rotor 80 includes an output shaft 81, a tubular rotor core 82, an annular magnet 83, and a pair of magnet fixing plates 84, as shown in FIG. 18.

The output shaft 81 is pressed into and fixed to the rotor core 82 the rotor core 82. The rotor core 82 and the output shaft 81 may be formed integrally with each other or be fixed to each other by an adhesive agent. The rotor core 82 includes a large diameter portion 82b located at the axially middle part and a pair of small diameter portions 82a located at the axial ends.

The annular magnet 83 includes sixteen magnets 83a to 83d arranged at an equiangular interval about the axis of the output shaft 81.

Figure 19:
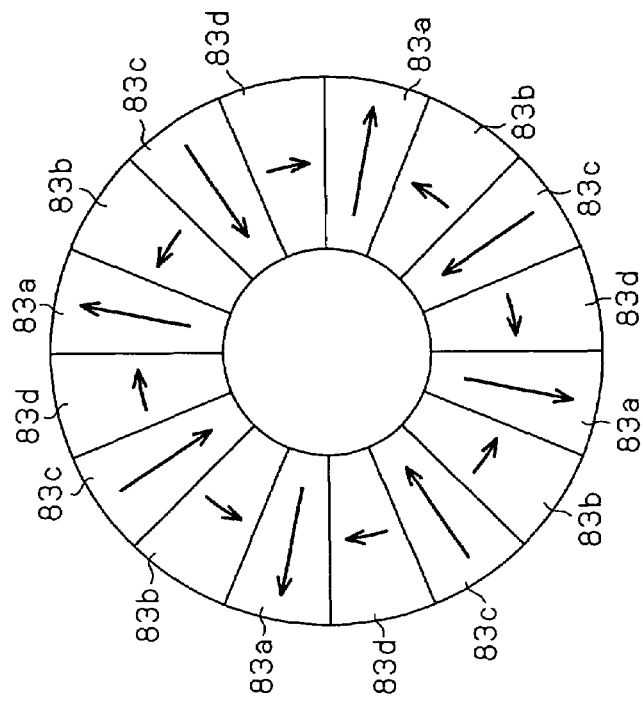
FIG. 19 is a cross-sectional view of a rotor viewed in the direction of arrow D in FIG. 18.

FIG. 19 shows a cross-sectional view of the rotor 80 as seen in the direction of arrow D in FIG. 18. The magnets 83a to 83d of the annular magnet 83 are each magnetized in the direction shown by an arrow in FIG. 19 and are in a halbach arrangement in which one rotation of the annular magnet 83 generates four cycles of a sinusoidal wave. That is, the annular magnet 83 includes eight main magnets 83a, 83c magnetized in the radial direction, and eight auxiliary magnets 83b, 83d magnetized in the circumferential direction. Each main magnet 83a, 83c is adjacent to the corresponding auxiliary magnet 83b, 83d in the circumferential direction of the output shaft 81. The number of poles of the annular magnet 83 is the same as the number of poles of the armature winding 1 of the first embodiment, and the rotor 80 rotates when the drive current is supplied to the armature winding 1 by the controller 100 of FIG. 27. The magnets 83a to 83d are fixed to each other by an adhesive agent and fixed to the large diameter portion 82b by an adhesive agent. The size of each magnet 83a to 83d in the radial direction of the output shaft 81 is greater than the size of each magnet 83a to 83d in the circumferential direction of the output shaft.

Each magnet fixing plate 84 is made of a non-magnetic material or a slightly magnetic material, and includes a disk portion 84a with a central fixing hole 84b, as shown in FIG. 18. Each disk portion 84a has a magnet contacting surface 84d that contacts the corresponding end surface 83e of the annular magnet 83. Each fixing hole 84b is defined by a fitting portion 84c projecting outward from the magnet contacting surface 84d. The magnet fixing plate 84 is fixed to the rotor core 82 when the small diameter portion 82a of the rotor core 82 is press fitted into the fitting portion 84c. The annular magnet 83 is fixed to the magnet fixing plates 84 when the magnet contacting surface 84d of each magnet fixing plate 84 is fixed to the corresponding end surface 83e of the annular magnet 83 by adhesive agent.

The third embodiment has the advantages described below in addition to the advantages of the first embodiment.

Compared to the surface permanent magnet type shown in the first embodiment, the effective magnetic flux is increased even if the magnet has the same volume by using the magnets 83a to 83d in the halbach arrangement. Since the winding is arranged between the core 3a and the rotor core 9 as shown in FIG. 1 when using a slotless armature, the air gap tends to be larger and the amount of magnetic flux tends to be smaller in comparison with a rotating electric machine including slots. However, when the magnets are in a halbach arrangement, the amount of effective magnetic flux is increased even if the magnet volume is the same, and the output of the slotless motor is increased. Further, the magnets 83a to 83d may be located closer to the output shaft 81 since leakage of the magnetic flux toward the output shaft 81 is subtle. Therefore, the volume of the magnet increases and the motor output is further improved. Further, the drivability is improved by the hollow structure of the rotor. Moreover, the magnetic flux distribution of the outer circumferential surface of the rotor is closer to a sinusoidal wave compared to that of conventional surface permanent magnet type, and torque ripple caused by harmonic magnetic flux is reduced.

The size of each magnet 83a to 83d in the radial direction of the output shaft 81 is greater than the size of each magnet 83a to 83d in the circumferential direction of the output shaft 81. The magnetic flux density at the operating point of the magnetic flux is thereby increased. The motor characteristics are also improved.

The annular magnet 83 and the rotor components other than the annular magnet 83 may be fixed by the magnet fixing plates 84 in an ensured manner. The magnet fixing plates 84 prevent the annular magnet 83 from falling off. Since the magnet fixing plates 84 are arranged at both ends of the annular magnet 83, the mechanical gap and the magnetic gap at the outer circumferential surface of the annular magnet 83 may be equivalent. Further, the motor characteristics are ensured since eddy current loss does not occur.

The third embodiment may be modified as described below.

Figure 20:
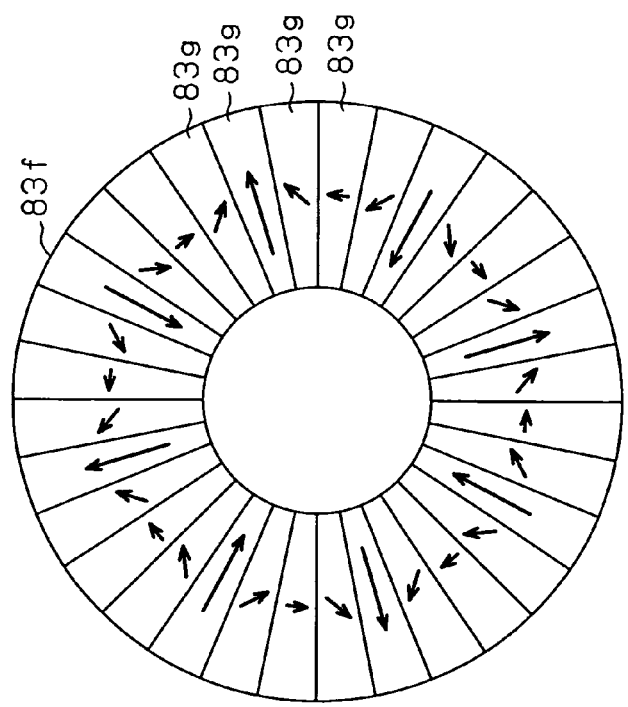
FIG. 20 is a cross-sectional view showing an annular magnet in a further modification of the present invention.

The number of magnets 83a to 83d configuring the annular magnet 83 is not limited to sixteen. The annular magnet 83 may be formed by thirty-two magnets 83g, as shown in FIG. 20. As the number of magnets forming the annular magnet 83 increases, the harmonic component of the magnetic flux of the magnet further decreases and the motor characteristics are improved.

The number of magnet fixing plates 84 may be one.

Figure 33:
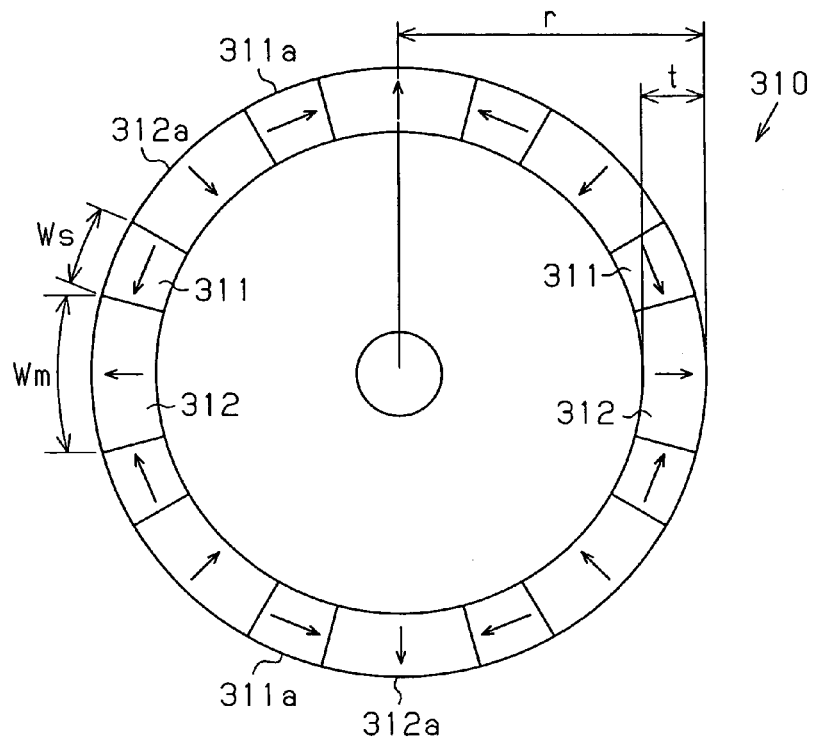
FIG. 33 is a cross-sectional view of a rotor in a further modification of the present invention.

In the third embodiment, eight magnetic poles are formed by the eight main magnets 83a, 83c, which are magnetized in the radial direction, and the eight auxiliary magnets 83b, 83d, which are magnetized in the circumferential direction. In other words, the rotor 80 has a halbach arrangement in which one magnetic pole is formed by a plurality of magnets. In this case, as shown in FIG. 33, with regards to the auxiliary magnet 311 and the main magnet 312 of the rotor 310, if the relationship between the circumferential direction size Ws of the surface 311a at the outer circumferential side of the auxiliary magnet 311 and the radial direction size t of the auxiliary magnet 311 satisfies 0<Ws<1.5t, further advantages are obtained as described below.

The average torque of the motor incorporating the rotor 310 in the halbach arrangement with the auxiliary magnets 311 satisfying the above relationship, and the average torque of the motor incorporating the rotor 4 of SPM type (Surface Permanent Magnet) in the normal arrangement in which one magnetic pole is formed by one permanent magnet 9a as shown in the first embodiment will now be compared.

Figure 34:
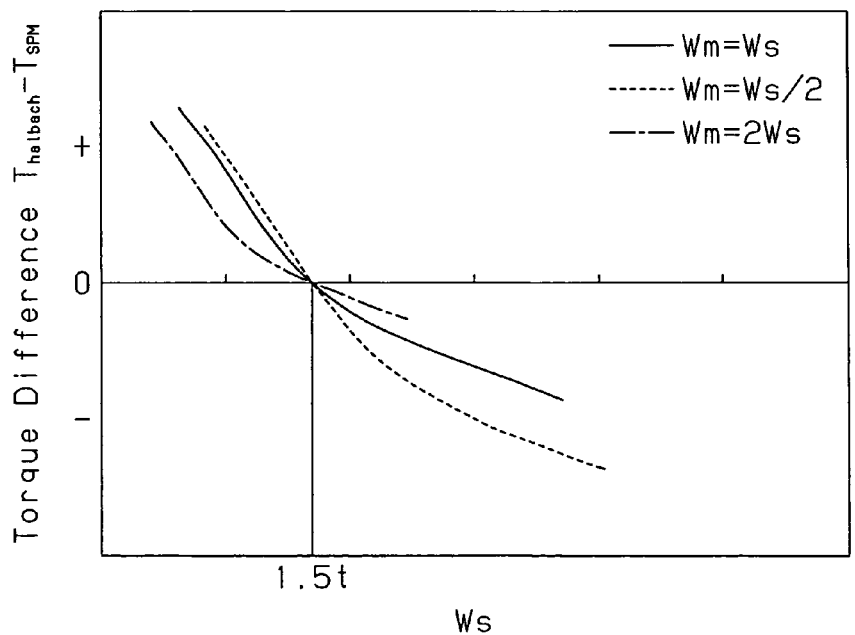
FIG. 34 is a graph showing the relationship of a circumferential direction size Ws of a surface on the stator side of the auxiliary magnet and a difference between an average torque $T_{halbach}$ of a motor incorporating the rotor including permanent magnets in a halbach arrangement and an average torque $T_{SPM}$ of a motor incorporating an SPM type rotor including permanent magnets in a normal arrangement.

FIG. 34 shows the difference between the average torque $T_{halbach}$ in the motor in with the rotor including the magnets of halbach arrangement and the average torque $T_{SPM}$ in the motor incorporating the SPM type rotor including the magnets in the normal arrangement when the radial direction size t of the auxiliary magnet 311 and the circumferential direction size Ws of the surface on the stator of the auxiliary magnet 311 are changed. In FIG. 34, the difference between $T_{halbach}$ and $T_{SPM}$ when the relationship between the circumferential direction size Wm (see FIG. 33) of the surface on the stator side of the main magnet 312 and the circumferential direction size Ws of the surface on the stator side of the auxiliary magnet 311 is Wm=Ws is shown by a solid line, the difference between $T_{halbach}$ and $T_{SPM}$ of when Wm=Ws/2 is shown by a broken line, and the difference between $T_{halbach}$ and $T_{SPM}$ when Wm=2 Ws is shown by single-dashed line. The amount and the performance (magnetic flux density etc.) of the magnets equalized in the two motors from which the difference of the average torques is taken.

As apparent from FIG. 34, the average torque $T_{halbach}$ in the motor incorporating the rotor including the magnets in the halbach arrangement is larger than the average torque $T_{SPM}$ in the motor incorporating the SPM type rotor including the magnets of normal arrangement when the circumferential direction size Ws of the surface on the stator side of the auxiliary magnet 311 is smaller than 1.5t, that is, in the range of 0<Ws<1.5t. Thus, the average torque is greater than that of the motor incorporating the SPM type rotor including the permanent magnets 9a in the normal arrangement by using the auxiliary magnets 311 in which the relationship between the circumferential direction size Ws and the radial direction size t satisfies 0<Ws<1.5t. This ensures that the torque is increased while reducing the torque ripple in the motor including the magnets (main magnet 312 and auxiliary magnet 311) in the halbach arrangement compared to the SPM type motor including the permanent magnets 9a (see FIG. 1B(b)) in the normal arrangement.

Figure 35:
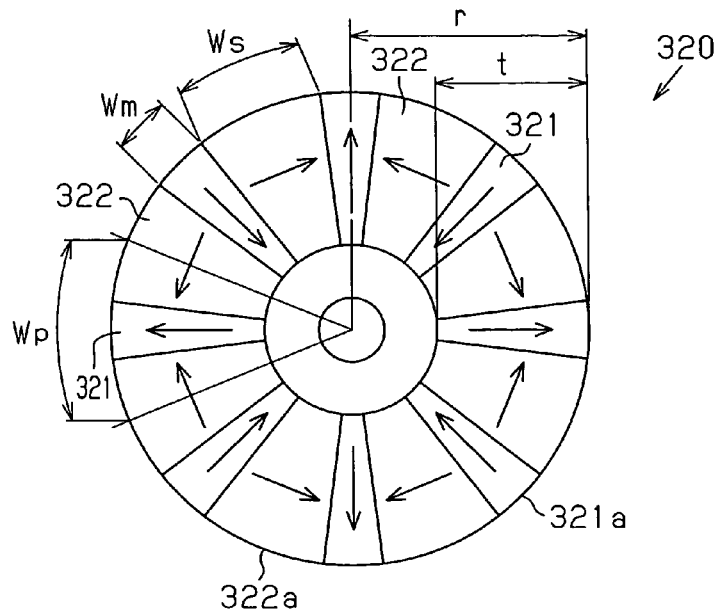
FIG. 35 is a cross-sectional view of a rotor according to a further modification of the present invention.

With regards to the main magnet 321 and the auxiliary magnet 322 of the rotor 320, as shown in FIG. 35, if the circumferential direction size Wm of the surface 321a of the outer circumference side of each main magnet 321 and the magnetic pole pitch width Wp satisfies 0.1Wp<Wm<0.45Wp or 0.6Wp<Wm<0.85Wp, further advantages are obtained as described below.

Figure 36:
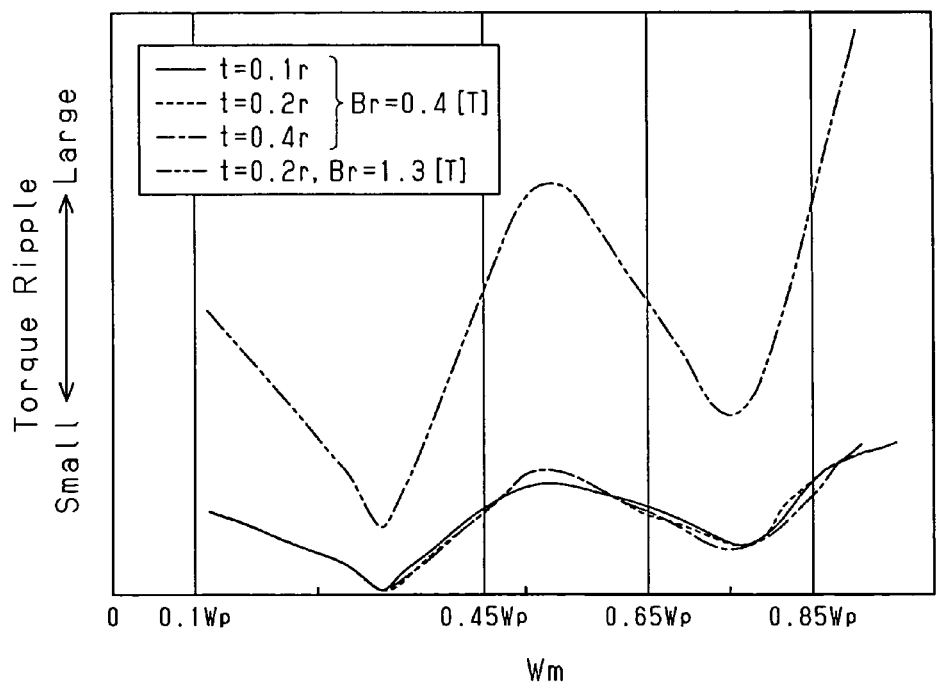
FIG. 36 is a graph showing the relationship between the circumferential direction size Wm of the surface on the stator side of the main magnet and the torque ripple.

FIG. 36 shows the relationship between the circumferential direction size Wm of the surface on the stator of the main magnet and the torque ripple in the motor incorporating the eight-pole surface permanent magnet type (SPM type) rotor in which the permanent magnets are in the halbach arrangement. In the graph of FIG. 36, the solid line shows the relationship between Wm and torque ripple if the radial direction size t of the main magnet is t=0.1r (r is radius of rotor) when the main magnet and the auxiliary magnet having the remaining magnetic flux density Br of Br=0.4[T] are arranged in the motor. Further, if the main magnet and the auxiliary magnet having the remaining magnetic flux density Br of Br=0.4[T] are arranged in the motor, the broken line in the graph shows the relationship between Wm and the torque ripple when the radial direction size t of the main magnet is t=0.2r, and the single-dashed line in the graph shows the relationship between Wm and the torque ripple when the radial direction size t of the main magnet is t=0.4t. In FIG. 36, if the main magnet and the auxiliary magnet having the remaining magnetic flux density Br of Br=1.3[T] are arranged in the motor, the double-dashed line in the graph shows the relationship between Wm and torque ripple when the radial direction size t of the main magnet is t=0.2r.

As apparent from FIG. 36, the graph of the torque ripple of when Wm is changed is substantially W-shape irrespective of whether the remaining magnetic flux density Br of the main magnet and the auxiliary magnet is Br=0.4[T] or Br=1.3[T] and irrespective of whether the radial direction size t of the main magnet is t=0.1r, 0.2r, or 0.4r. Specifically, the four graphs are convex downward in the range of 0<Wm≦0.5Wp. Further, the four graphs project downward in the range of 0.5Wp<Wm<Wp. As apparent from FIG. 36, when the remaining magnetic flux density Br becomes smaller, the level differences in the graph becomes smaller, and the torque ripple gradually changes as the value of Wm changes.

In view of the above, it is apparent from FIG. 36 that when the main magnet is formed so as to satisfy 0.1Wp<Wm<0.45Wp or 0.6Wp<Wm<0.85Wp, the reduction of the torque ripple is ensured compared to the conventional motor in which the circumferential direction sizes Wm, Ws of the surface on the stator side of the main magnet and the auxiliary magnet are formed equal to each other irrespective of the remaining magnetic flux density Br.

Figure 37:
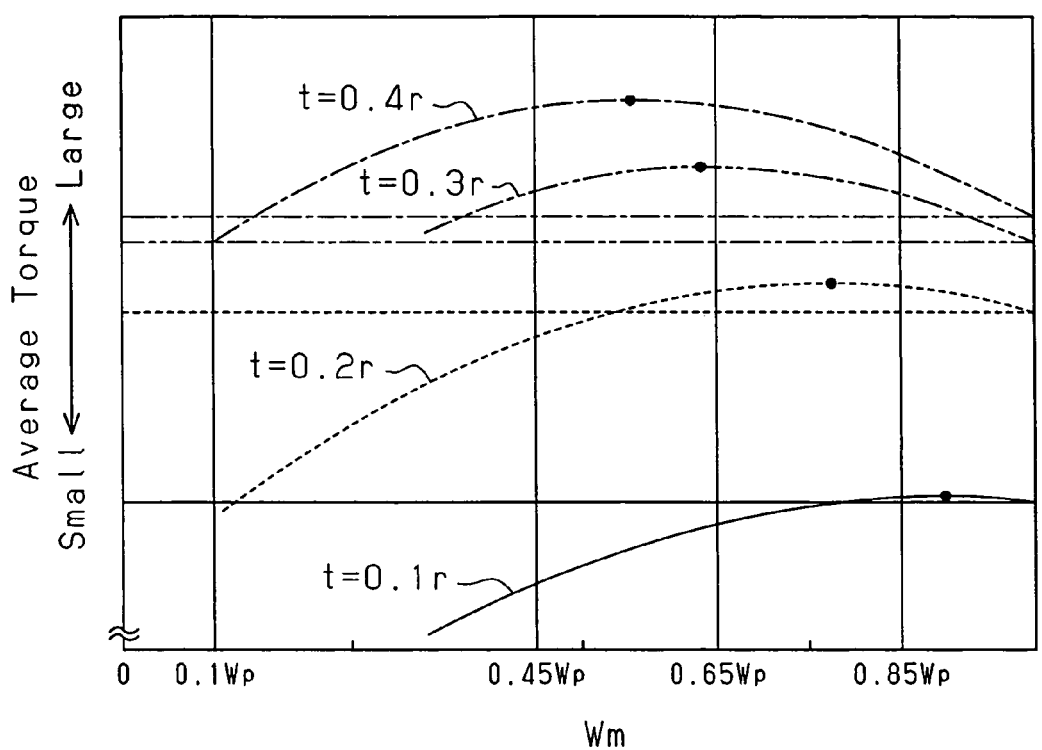
FIG. 37 is a graph showing the relationship between the circumferential direction size Wm of the surface on the stator side of the main magnet and the average torque.

FIG. 37 shows the relationship between the circumferential direction size Wm of the surface on the stator of the main magnet and the average torque in the motor incorporating the eight-pole surface permanent magnet type (SPM type) rotor in which the permanent magnets are in the halbach arrangement. In the graph of FIG. 37, the solid line (curve) shows the relationship between Wm and the average torque when the radial direction size t of the main magnet is t=0.1r and the broken line (curve) shows the relationship between Wm and average torque when the radial direction size t of the main magnet is t=0.2r. Further, double-dashed line (curve) shows the relationship between Wm and the average torque when the radial direction size t of the main magnet is t=0.3r, and the single-dashed line (curve) shows the relationship between Wm and average torque when the radial direction size t of the main magnet is t=0.4r.

FIG. 37 further shows the average torque in the motor incorporating the SPM type rotor including the permanent magnets in the normal arrangement in which one magnetic pole is formed by one permanent magnet. Specifically, in the graph, the solid line (straight line) shows the average torque when the same amount of permanent magnets as the permanent magnets (main magnet and auxiliary magnet) arranged in the motor in which the radial direction size t of the main magnet is t=0.1r is arranged in the motor incorporating the SPM type rotor including the permanent magnets in the normal arrangement. Further, in the graph, the broken line (straight line) shows the average torque of when the same amount of permanent magnets as the permanent magnets arranged in the motor in which the radial direction size t of the main magnet is t=0.2r is arranged in the motor incorporating the SPM type rotor including the permanent magnets in the normal arrangement. In the graph of the double-dashed line (straight line), the average torque of when the same amount of permanent magnets as the permanent magnets arranged in the motor in which the radial direction size t of the main magnet is t=0.3r is arranged in the motor incorporating the SPM type rotor including the permanent magnets in the normal arrangement. Further, in the graph of the single-dashed line (straight line), the average torque when the same amount of permanent magnets as the permanent magnets arranged in the motor in which the radial direction size t of the main magnet is t=0.4r is arranged in the motor incorporating the SPM type rotor including the permanent magnets in the normal arrangement.

As shown in FIG. 37, the graphs showing the relationship between the circumferential direction size Wm of the surface on the stator of the main magnet and the average torque are curves projecting upward irrespective of whether the radial direction size t of the main magnet is t=0.1r, 0.2r, 0.3r, or 0.4r. The maximum values of the average torque in the four graphs showing the relationship between Wm and the average torque each take a value that is greater than the average torque of the motor incorporating the SPM type rotor including the permanent magnets in the normal arrangement. In other words, the maximum value of the average torque (curve of solid line) if Wm is changed when the radial direction size r of the main magnet is t=0.1r is a value greater than the average torque (line of solid line) of the motor including the same amount of permanent magnets as the permanent magnets, the permanent magnets being of normal arrangement, arranged in the motor in which the radial direction size t of the main magnet is t=0.1r. In the same manner, the maximum value of the average torque (curve of broken line) if Wm is changed when the radial direction size t of the main magnet is t=0.2r is a value greater than the average torque (straight line of broken line) of the motor including the same amount of permanent magnets as the permanent magnets, the permanent magnets being of normal arrangement, arranged in the motor in which the radial direction size t of the main magnet is t=0.2r. In the same manner, the maximum value of the average torque (curve of double-dashed line) if Wm is changed when the radial direction size t of the main magnet is t=0.3r is a value greater than the average torque (straight line of double-dashed line) of the motor including the same amount of permanent magnets as the permanent magnets, the permanent magnets being of normal arrangement, arranged in the motor in which the radial direction size t of the main magnet is t=0.3r. Further, the maximum value of the average torque (curve of chain dashed line) if Wm is changed when the radial direction size t of the main magnet is t=0.4r, is a value greater than the average torque (line of chain dashed line) of the motor including the same amount of permanent magnets as the permanent magnets, the permanent magnets being of normal arrangement, arranged in the motor in which the radial direction size t of the main magnet is t=0.4r.

As apparent from FIG. 37, in the four graphs showing the relationship between the circumferential direction size Wm of the surface on the stator side of the main magnet and the average torque, the value of Wm (shown by dots in the graph of FIG. 37) at which the average torque is maximum becomes smaller as the radial direction size t of the main magnet becomes larger. When the main magnet is formed to satisfy $0.1Wp<Wm<0.45Wp$, the average torque in the motor including the permanent magnets in the halbach arrangement is the same or greater than the average torque in the SPM type motor including the permanent magnets of normal arrangement if the radial direction size of the main magnet is $t \geqq 0.3r$. Further, when the main magnet is formed so as to satisfy $0.6Wp<Wm<0.85Wp$, the average torque in the motor including the permanent magnets in the halbach arrangement is the same or greater than the average torque in the SPM type motor including the permanent magnets in the normal arrangement if the radial direction size of the main magnet is $t \geqq 0.1r$. Therefore, the motor including the permanent magnets in the halbach arrangement has a greater average torque while reducing the torque ripple by setting the circumferential direction size Wm of the surface on the stator side of the main magnet and the radial direction size t of the main magnet in the above manner.

A fourth embodiment of the present invention will now be described. A rotor 85 of the fourth embodiment includes an output shaft 86 and a rotor core 87, which are described in the third embodiment, and an annular magnet 88 and a pair of magnet fixing plates 89, which are used in lieu of the annular magnet 83 and the pair of magnet fixing plates 84. The output shaft 86 and the rotor core 87 will thus not be described, and the differences of the annular magnet 88 and the magnet fixing plates 89 from the annular magnet 83 and the magnet fixing plates 84 will be described in detail.

Figure 21:
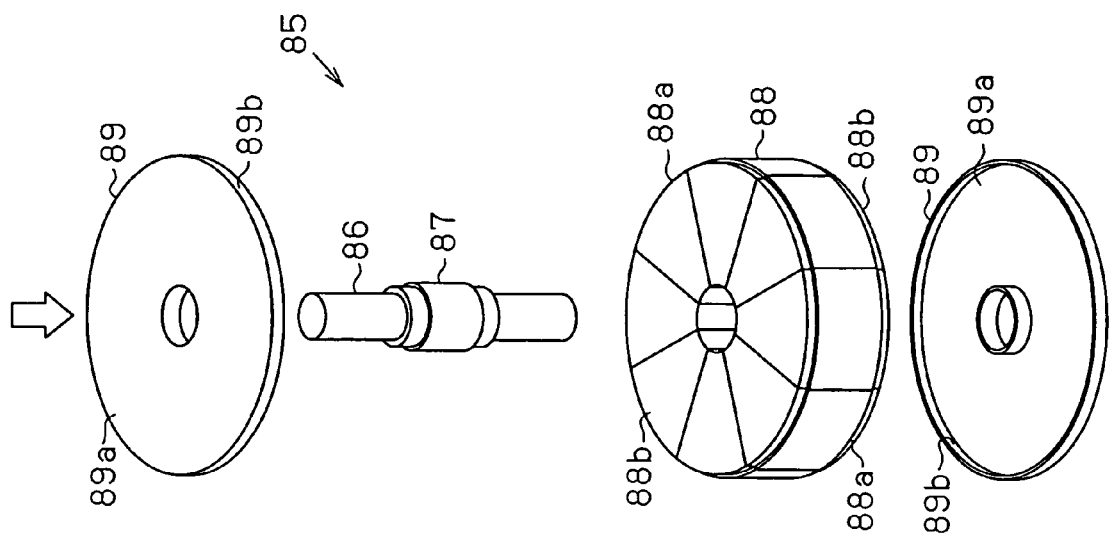
FIG. 21 is an exploded perspective view showing a rotor according to a fourth embodiment of the present invention.

FIG. 21 is an exploded perspective view of the rotor 85 in accordance with the fourth embodiment. As shown in FIG. 21, the annular magnet 88 includes end surfaces 88b and an annular recess 88a extending across the entire outer circumference of the annular magnet 88 and formed on both end surfaces of the annular magnet 88. Therefore, the outer diameter of the annular magnet 88 is decreased at the two end surfaces.

A disk portion 89a of the magnet fixing plate 89 includes an annular projection 89b projecting from the outer circumferential edge of the disk portion 89a at the surface facing the annular magnet 88. The annular projection 89b is arranged coaxially with the disk portion 89a and is integrally formed with the disk portion 89a. The inner diameter of the annular projection 89b is substantially the same as the outer diameter of the two end surfaces of the annular magnet 88, and the annular magnet 88 is fixed to the magnet fixing plate 89 by fitting the annular projection 89b into the annular recess 88a. In other words, a support structure formed by the annular recess 88a and the annular projection 89b supports to the annular magnet 88. The outer diameter of the annular projection 89b is smaller than the outer diameter of the maximum outer diameter portion (portion of the annular magnet 88 that does not include the annular recess 88a) of the annular magnet 88.

The fourth embodiment has the advantages described below in addition to the advantages of the third embodiment.

With the magnet fixing plates 89 and the annular magnet 88 described above, the annular magnet 88 is supported by the annular projection 89b when the annular projection 89b is fitted into the annular recess 88a. Therefore, the annular magnet 88 fixed in a further ensured manner while obtaining the same mechanical gap and the magnetic gap.

The outer diameter of the annular projection 89b is smaller than the maximum outer diameter portion of the annular magnet 88. Thus, the possibility of the armature 3 (see FIG. 1) contacting the magnet fixing plate 89 is reduced.

The fourth embodiment may be modified as described below.

Figure 23:
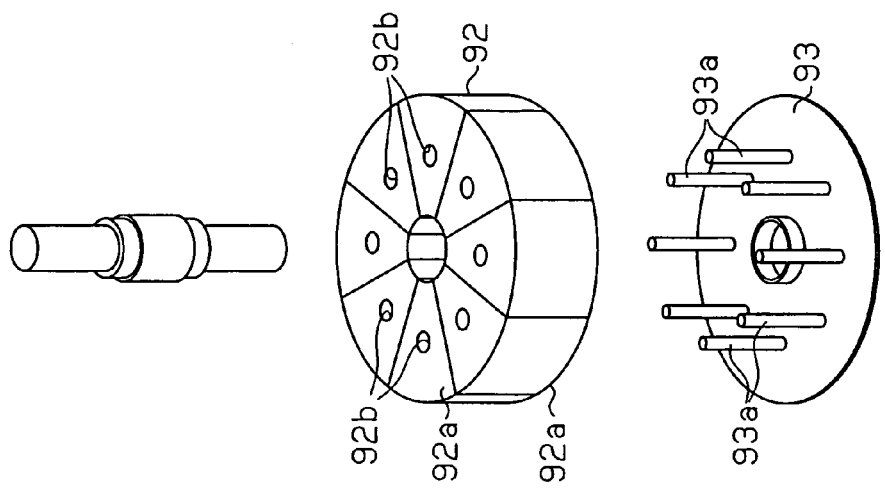
FIGS. 22 to 26 are exploded perspective views showing a rotor in a further five modifications of the present invention.
Figure 22:
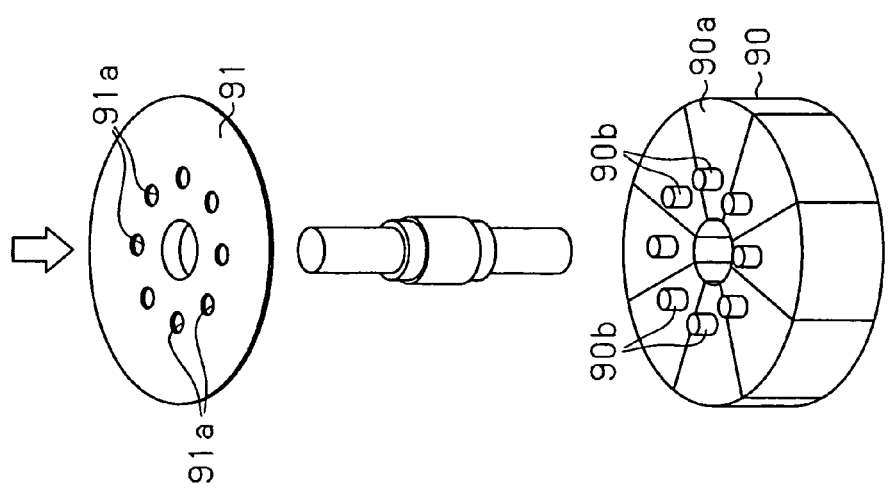
Figure 26:
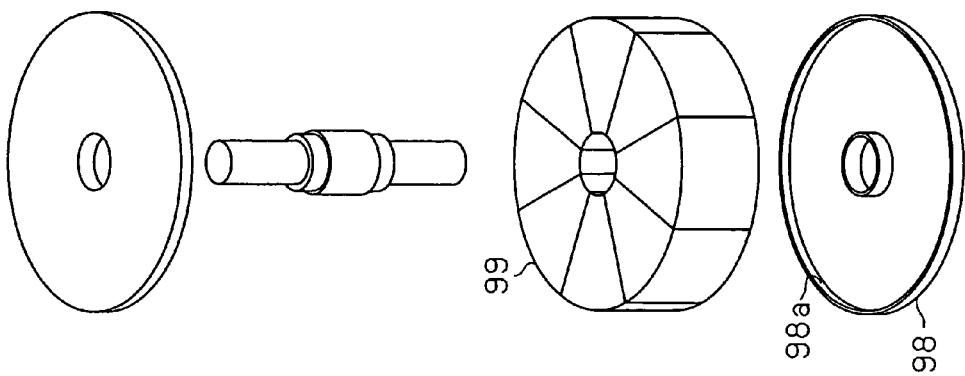
Figure 25:
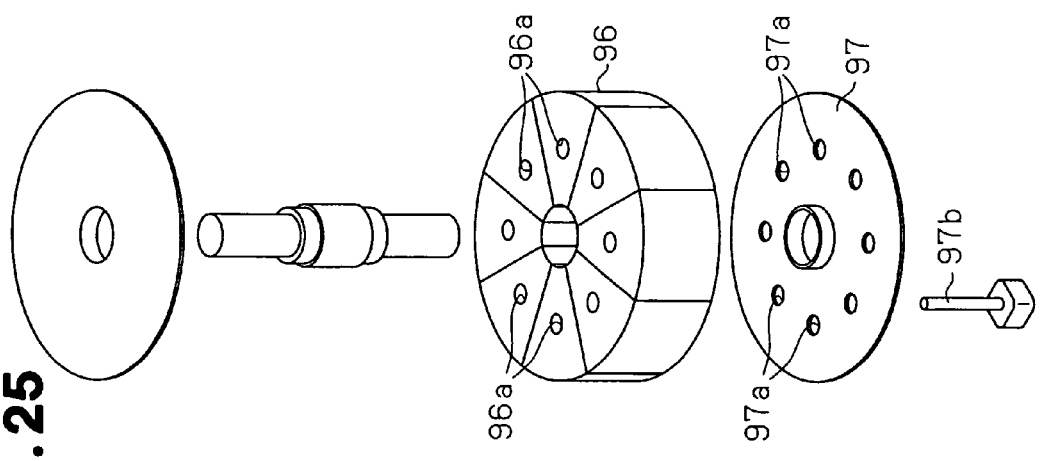
Figure 24:
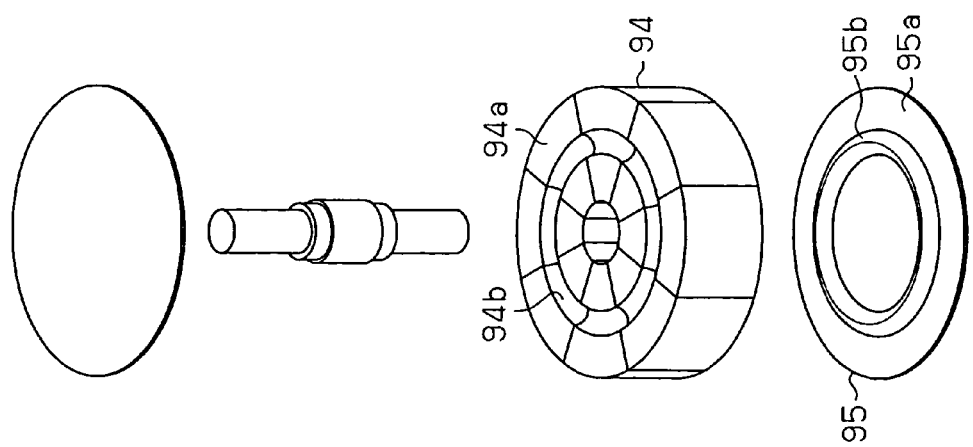

The support structure formed by the annular magnet 88 and the magnet fixing plate 89 may be changed as shown in FIG. 22 to FIG. 26. In FIG. 22, a plurality of fixing projections 90b project from the end surface 90a of an annular magnet 90. Further, projection sockets 91a extend through the magnet fixing plate 91 in the plate thickness direction at positions corresponding to the fixing projections 90b. In FIG. 23, through-holes 92b extend through an annular magnet 92 between the two end surfaces 92a of the annular magnet 92. Fitting shafts 93a are formed on a magnet fixing plate 93 at positions corresponding to the through-holes 92b of the annular magnet 92. In FIG. 24, an annular recess 94b is formed in the end surface 94a of an annular magnet 94. Further, an annular projection 95b is formed in the surface 95a of a magnet fixing plate 95 facing the annular magnet 94. In FIG. 25, through holes 96a and 97a respectively extend through an annular magnet 96 and a magnet fixing plate 97. The annular magnet 96 is fixed to the magnet fixing plate 97 by inserting rivets 97b (or screws etc.) into the through holes 96a and 97a. In FIG. 26, an annular support portion 98a having an inner diameter greater than the outer diameter of an annular magnet 99 is formed on a magnet fixing plate 98.

In FIGS. 22 to 26, the movement of the annular magnets 90, 92, 94, 96, 99 towards the outer side in the radial direction is restricted by the magnet fixing plates 91, 93, 95, 97, 98. The annular magnets 90, 92, 94, 96, 99 are thus fixed in an ensured manner by the magnet fixing plates 91, 93, 95, 97, 98, and the possibility of the annular magnets 90, 92, 94, 96, 99 falling off is reduced. Since the magnet fixing plates 91, 93, 95, 97 do not project in the radially outward direction of the annular magnets 90, 92, 94, 96, the possibility of the armature 3 (see FIG. 1) contacting the magnet fixing plates 91, 93, 95, 97 is reduced.

A plurality of recesses extending along part of the outer circumference of the annular magnet 88 may be arranged on both end surfaces of the annular magnet 88 instead of the annular recess 88a, and a plurality of projections extending along part of the outer circumference of the magnet fixing plate 89 may be arranged on the magnet fixing plate 89 instead of the annular projection 89b.

The annular magnet 88 may be supported only from one side by a single magnet fixing plate 89 instead of being supported from both sides by two magnet fixing plates 89.

What is claimed is:

1. An armature winding comprising:
   a tubular member;
   a first conductor, arranged in a radially inner side of the tubular member, for receiving current; and
   a second conductor, arranged in a radially outer side of the tubular member, for receiving current;
   wherein the first conductor includes a first coated portion, coated by an insulator, and a first wire connection portion, located at an end of the first coated portion and being free from the insulator, and the second conductor includes a second coated portion, coated by an insulator, and a second wire connection portion, located at an end of the second coated portion and being free from the insulator, the first wire connection portion and the second wire connection portion being electrically connected to each other.

2. The armature winding according to claim 1, wherein the first conductor and the second conductor extend in different torsional directions.

3. The armature winding according to claim 1, wherein the first conductor and the second conductor each include an inclined portion inclined with respect to an axis of the tubular member and a parallel portion extending parallel to the axis of the tubular member.

4. The armature winding according to claim 1, wherein:
   the first conductor includes a plurality of first conductor strips aligned in a first direction, the first conductor strips extending in a second direction that differs from the first direction, and the first conductor having a cross-sectional shape in which its longitudinal direction coincides with the first direction; and
   the second conductor includes a plurality of second conductor strips aligned in a third direction, the second conductor strips extending in a fourth direction that differs from the third direction, and the second conductor having a cross-sectional shape in which its longitudinal direction coincides with the third direction.

5. The armature winding according to claim 1, wherein the first conductor and the second conductor are each smaller in size in a radial direction of the tubular member than in a circumferential direction of the tubular member.

6. The armature winding according to claim 1, wherein the first conductor and the second conductor each have a cross-sectional shape including at least two corners.

7. The armature winding according to claim 1, wherein the first wire connection portion and the second wire connection portion are each thicker at its middle part than at its ends with respect to the circumferential direction of the tubular member.

8. The armature winding according to claim 7, wherein the first conductor and second conductor each have an elliptical cross-section.

9. The armature winding according to claim 1, wherein the first conductor and the second conductor each have a circular cross-section.

10. The armature winding according to claim 1, wherein the first wire connection portion and the second wire connection portion project from an edge of the tubular member so that the first wire connection portion and the second wire connection portion do not overlap the tubular member in the radial direction of the tubular member.

11. A method for manufacturing an armature winding, the armature winding including a tubular member, a first conductor, arranged in a radially inner side of the tubular member, for receiving current, and a second conductor, arranged in a radially outer side of the tubular member, for receiving current, wherein the first conductor includes a first coated portion, coated by an insulator, and a first wire connection portion, located at an end of the first coated portion and being free from the insulator, and the second conductor includes a second coated portion, coated by an insulator, and a second wire connection portion, located at an end of the second coated portion and being free from the insulator, the first wire connection portion and the second wire connection portion being electrically connected to each other, the method comprising the steps of:

forming the first conductor and the second conductor;

forming the tubular member;

fixing the first conductor to an inner surface of the tubular member and fixing the second conductor to an outer surface of the tubular member; and electrically connecting the first wire connection portion of the first conductor and the second wire connection portion of the second conductor, which are fixed to the tubular member, to each other.

12. A method for manufacturing an armature winding, the armature winding including a tubular member, a first conductor, arranged in a radially inner side of the tubular member, for receiving current, and a second conductor, arranged in a radially outer side of the tubular member, for receiving current, wherein the first conductor includes a first coated portion, coated by an insulator, and a first wire connection portion, located at an end of the first coated portion and being free from the insulator, and the second conductor includes a second coated portion, coated by an insulator, and a second wire connection portion, located at an end of the second coated portion and being free from the insulator, the first wire connection portion and the second wire connection portion being electrically connected to each other, the method comprising the steps of:

forming the first conductor and the second conductor;

fixing the first conductor and the second conductor to a plate member having a first surface and a second surface, the first conductor being fixed to the first surface, and the second conductor being fixed to the second surface;

forming a tubular shape with the plate member to which the first conductor and the second conductor are fixed so that the first conductor is arranged at the radially inner side of the tubular member and the second conductor is arranged at the radially outer side of the tubular member; and electrically connecting the first wire connection portion of the first conductor and the second wire connection portion of the second conductor to each other.

13. The method according to claim 12, wherein the electrical connection between the first wire connection portion and the second wire connection portion is performed after forming a tubular shape with the plate member to which the first conductor and the second conductor are fixed.

14. A slotless motor comprising:

an armature winding including:

a tubular member;

a first conductor, arranged in a radially inner side of the tubular member, for receiving current; and a second conductor, arranged in a radially outer side of the tubular member, for receiving current, wherein the first conductor includes a first coated portion, coated by an insulator, and a first wire connection portion, located at an end of the first coated portion and being free from the insulator, and the second conductor includes a second coated portion, coated by an insulator, and a second wire connection portion, located at an end of the second coated portion and being free from the insulator, the first wire connection portion and the second wire connection portion being electrically connected to each other.

15. The slotless motor according to claim 14, further comprising a rotor including a plurality of magnets arranged in a halbach arrangement.

16. The slotless motor according to claim 15, wherein the magnet is larger in size in a radial direction of the rotor than in a circumferential direction of the rotor.

17. The slotless motor according to claim 15, wherein the rotor includes a magnet fixing plate made of a non-magnetic body or a slightly magnetic body, the magnet fixing plate contacting one end of the magnet in an axial direction of the rotor.

18. The slotless motor according to claim 14, wherein the first conductor and the second conductor are connected via an external inductance to a drive circuit for supplying drive current to the first conductor and the second conductor.

* * * * *